US012004238B2

(12) United States Patent
Ajami et al.

(10) Patent No.: US 12,004,238 B2
(45) Date of Patent: Jun. 4, 2024

(54) LOW LATENCY SCHEMES FOR PEER-TO-PEER (P2P) COMMUNICATIONS

(71) Applicant: QUALCOMM Incorporated, San Diego, CA (US)

(72) Inventors: Abdel Karim Ajami, San Diego, CA (US); Sai Yiu Duncan Ho, San Diego, CA (US); George Cherian, San Diego, CA (US); Alfred Asterjadhi, San Diego, CA (US); Abhishek Pramod Patil, San Diego, CA (US); Yanjun Sun, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/513,645

(22) Filed: Oct. 28, 2021

(65) Prior Publication Data

US 2023/0137826 A1 May 4, 2023

(51) Int. Cl.
*H04W 74/0833* (2024.01)
*H04L 5/00* (2006.01)
*H04L 67/104* (2022.01)

(52) U.S. Cl.
CPC ......... *H04W 74/085* (2013.01); *H04L 5/0055* (2013.01); *H04L 5/0098* (2013.01); *H04L 67/104* (2013.01)

(58) Field of Classification Search
CPC ......... H04W 74/0833; H04W 74/0841; H04W 72/104; H04W 74/085; H04L 5/0053;
(Continued)

(56) References Cited

U.S. PATENT DOCUMENTS

2007/0104138 A1 5/2007 Rudolf et al.
2007/0286130 A1 12/2007 Shao et al.
(Continued)

FOREIGN PATENT DOCUMENTS

| CN | WO2016026454 | * | 2/2016 | ............ H04W 72/04 |
| GB | WO2022073720 | * | 4/2022 | ............ H04W 16/14 |
| WO | WO-2022250414 A1 | | 12/2022 | |

OTHER PUBLICATIONS

Das D (Intel)., et al., "PDT: Channel Access For Triggered TXOP Sharing", IEEE Draft, 11-21-0268-02-00BE-PDT-Channel-Access-Triggered-SU, IEEE-SA Mentor, Piscataway, NJ, USA, vol. 802.11 EHT, 802.11be, No. 2, Apr. 15, 2021, pp. 1-7, Mar. 17, 2021, XP068179754, Mar. 2021, Para 9.3.1.22.5, 35.2.1.3.1, 35.2.1.3.3, Figures 35-xy.

(Continued)

*Primary Examiner* — Warner Wong
(74) *Attorney, Agent, or Firm* — Holland & Hart LLP

(57) ABSTRACT

This disclosure provides systems and methods for requesting wireless resources for peer-to-peer (P2P) communications. In some implementations, a wireless communication device transmits a frame over a wireless medium to an access point (AP), the frame including a medium access control (MAC) header carrying a request for the AP to allocate part of a transmission opportunity (TXOP) for P2P communications between the wireless communication device and a client device. The wireless communication device receives a trigger frame allocating a portion of the TXOP for the P2P communications, and transmits or receives P2P data to or from the client device over the wireless medium during the allocated portion of the TXOP. In some instances, the MAC header of the frame includes a Quality-of-Service (QoS) Control field carrying the request. In some other instances, (Continued)

the MAC header of the frame includes an Aggregated-Control (A-Control) subfield carrying the request.

28 Claims, 14 Drawing Sheets

(58) Field of Classification Search
CPC ... H04L 5/0055; H04L 5/0096; H04L 5/0098; H04L 67/10; H04L 67/104; H04L 67/1093; H04L 5/003; H04L 2012/5631
See application file for complete search history.

(56) References Cited

U.S. PATENT DOCUMENTS

| | | | |
|---|---|---|---|
| 2010/0189048 A1 | 7/2010 | Baker et al. | |
| 2011/0069689 A1* | 3/2011 | Grandhi | H04W 76/23 709/205 |
| 2011/0310762 A1* | 12/2011 | Choi | H04W 72/20 370/336 |
| 2012/0120892 A1* | 5/2012 | Freda | H04W 8/005 370/329 |
| 2013/0089010 A1* | 4/2013 | Richardson | H04W 76/14 455/418 |
| 2013/0170468 A1* | 7/2013 | Baker | H04W 72/542 370/336 |
| 2014/0328262 A1* | 11/2014 | Sampath | H04L 5/0073 370/329 |
| 2014/0328329 A1* | 11/2014 | Novlan | H04W 56/0015 370/336 |
| 2015/0334714 A1* | 11/2015 | Wang | H04L 47/30 370/329 |
| 2017/0118775 A1* | 4/2017 | Seok | H04L 69/324 |
| 2018/0368191 A1 | 12/2018 | Vutukuri et al. | |
| 2019/0289615 A1* | 9/2019 | Lee | H04W 80/02 |
| 2020/0337083 A1* | 10/2020 | Loehr | H04W 74/0808 |
| 2021/0111855 A1* | 4/2021 | Verma | H04L 5/0075 |
| 2021/0168712 A1* | 6/2021 | Cherian | H04W 72/27 |
| 2021/0378039 A1* | 12/2021 | Cherian | H04W 8/24 |
| 2022/0053560 A1* | 2/2022 | Xin | H04W 74/085 |
| 2022/0210779 A1* | 6/2022 | Shin | H04L 5/0051 |
| 2022/0264566 A1 | 8/2022 | Chu et al. | |
| 2022/0312513 A1* | 9/2022 | Chitrakar | H04W 76/30 |
| 2023/0104446 A1* | 4/2023 | Ajami | H04W 84/12 370/329 |
| 2023/0292363 A1* | 9/2023 | Sundman | H04W 74/04 |

OTHER PUBLICATIONS

International Search Report and Written Opinion—PCT/US2022/041924—ISA/EPO—dated Nov. 23, 2022.
Liwen C (NXP): "CC36 Comment Resolution: Triggered TXOP Sharing", IEEE Draft, 11-21-1509-00-00BE-CC36-Comment-Resolution-Triggered-TXOP-Sharing, IEEE-SA Mentor, Piscataway, NJ, USA, vol. 802.11 EHT, 802.11be, Sep. 13, 2021, pp. 1-11, Aug. 20, 2020, XP068184911, Oct. 2021, The Whole Document.

* cited by examiner

1400

| Applicable frame (subtypes) | Bits 0-3 | Bit 4 | Bits 5-6 | Bit 7 | Bits 8 | Bit 9 | Bit 10 | Bits 11-15 |
|---|---|---|---|---|---|---|---|---|
| QoS CF-Poll and QoS CF-Ack +CF-Poll frames sent by HC | TID | EOSP | Ack Policy Indicator | Reserved | TXOP Limit | | | |
| QoS Data +CF-Poll and QoS Data +CF-Ack +CF-Poll frames sent by HC | TID | EOSP | Ack Policy Indicator | A-MSDU Present | TXOP Limit | | | |
| QoS Data and QoS Data +CF-Ack frames sent by HC | TID | EOSP | Ack Policy Indicator | A-MSDU Present | AP PS Buffer State | | | |
| QoS Null frames sent by HC | TID | EOSP | Ack Policy Indicator | Reserved | AP PS Buffer State | | | |
| QoS Data and QoS Data +CF-Ack frames sent in a nonmesh BSS by non-AP STAs that are not a TPU buffer STA or a TPU sleep STA | TID | 0 | Ack Policy Indicator | A-MSDU Present | TXOP Duration Requested | | | |
| | TID | 1 | Ack Policy Indicator | A-MSDU Present | Queue Size | | | |
| QoS Null frames sent in a nonmesh BSS by non-AP STAs that are not a TPU buffer STA or a TPU sleep STA | TID | 0 | Ack Policy Indicator | Reserved | TXOP Duration Requested | | | |
| | TID | 1 | Ack Policy Indicator | Reserved | Queue Size | | | |
| QoS Data and QoS Data +CF-Ack frames sent by TPU buffer STAs | TID | EOSP | Ack Policy Indicator | A-MSDU Present | Reserved | | | |

| Applicable frame (subtypes) | Bits 0-3 | Bit 4 | Bits 5-6 | Bit 7 | Bits 8 | Bit 9 | Bit 10 | Bits 11-15 |
|---|---|---|---|---|---|---|---|---|
| QoS Null frames sent by TPU buffer STAs | TID | EOSP | Ack Policy Indicator | Reserved | Reserved | | | |
| QoS Data and QoS Data +CF-Ack frames sent by TPU sleep STAs | TID | Reserved | Ack Policy Indicator | A-MSDU Present | Reserved | | | |
| QoS Null frames sent by TPU sleep STAs | TID | Reserved | Ack Policy Indicator | Reserved | Reserved | | | |
| All frames sent by mesh STAs in a mesh BSS | TID | EOSP | Ack Policy Indicator | A-MSDU Present | Mesh Control Present | Mesh Power Save Level | RSPI | Reserved |

| 1411 | 1412 | 1413 | 1414 | 1415 |
|---|---|---|---|---|
| TID | EOSP | ACK Policy Indicator | Reserved | TXOP Duration Requested |

*Figure 14B*

LOW LATENCY SCHEMES FOR PEER-TO-PEER (P2P) COMMUNICATIONS

TECHNICAL FIELD

This disclosure relates generally to wireless communication, and more specifically, to dynamically scheduling resources of a shared wireless medium for peer-to-peer (P2P) communications.

Description of the Related Technology

A wireless local area network (WLAN) may be formed by one or more access points (APs) that provide a shared wireless medium for use by a number of client devices or stations (STAs). Each AP, which may correspond to a Basic Service Set (BSS), may periodically broadcast beacon frames to enable any STAs within wireless range of the AP to establish and maintain a communication link with the WLAN. WLANs that operate in accordance with the IEEE 802.11 family of standards are commonly referred to as Wi-Fi networks.

Some wireless communication devices may be associated with low-latency applications having strict end-to-end latency, throughput, and timing requirements for data traffic. Example low-latency applications include, but are not limited to, real-time gaming applications, video communications, and augmented reality (AR) and virtual reality (VR) applications (collectively referred to as extended reality (XR) applications). Such low-latency applications may specify various latency, throughput, and timing requirements for wireless communication systems that provide connectivity for these applications. Some low-latency applications utilize peer-to-peer (P2P) communications between a client device (such as an AR/VR headset) and a STA associated with an AP. For example, a wireless communication device executing a real-time gaming application may operate as a STA that transmits and receives gaming data to and from a gaming service via an associated AP while also operating as a softAP that transmits and receives gaming data to and from an associated AR/VR headset. When a STA operating as a SoftAP connected to an AR/VR headset (or other client device) via a P2P link executes a real-time gaming application, the P2P communications between the STA and the AR/VR headset may be subject to the latency, throughput, and timing requirements associated with the gaming application. Similarly, gaming data transmitted between the STA and an associated AP may also be subject to the latency, throughput, and timing requirements associated with the gaming application.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication by a wireless communication device. In some implementations, the method can include transmitting a frame over a wireless medium to an access point (AP), the frame including a medium access control (MAC) header carrying a request for the AP to allocate part of a transmission opportunity (TXOP) for peer-to-peer (P2P) communications between the wireless communication device and a client device. The method can include receiving a trigger frame over the wireless medium from the AP, the trigger frame allocating a portion of the TXOP to the wireless communication device for the P2P communications. The method can include transmitting or receiving P2P data to or from the client device over the wireless medium during the allocated portion of the TXOP. In some aspects, the request indicates one or more of a duration of the requested part of the TXOP, a requested bandwidth for the P2P communications, a traffic identifier (TID) of the P2P communications, a Stream Classification Service (SCS) identifier (SCSID) of the P2P communications, a requested start time of a service period associated with the P2P communications, a requested service interval for the P2P communications, a delay bound for the service period associated with the P2P communications, or a requested type of trigger frame.

In some implementations, the MAC header of the frame includes a Quality-of-Service (QoS) control field carrying the request. In some instances, the QoS control field includes a reserved bit set to a value indicating that the frame is a P2P request frame, a TID subfield set to a value indicating that the frame is a P2P request frame, the value being greater than or equal to 8, or an Acknowledgement (ACK) Policy Indicator subfield set to a value indicating that the frame is a P2P request frame. In some aspects, the QoS control field includes an End Of Service Period (EOSP) subfield, an ACK Policy Indicator subfield following the EOSP subfield, a reserved bit following the ACK Policy Indicator subfield, and an octet following the reserved bit, where the octet indicates one or more of a duration of the requested part of the TXOP, a queue size of the wireless communication device, or a TXOP sharing mode bandwidth based on values carried in the EOSP subfield and the reserved bit. For example, the EOSP subfield carrying a value of 0 when the reserved bit is set to 1 signals that the octet indicates the duration of the requested part of the TXOP and signals that the ACK Policy Indicator subfield indicates the TXOP sharing mode bandwidth, and the EOSP subfield carrying a value of 1 when the reserved bit is set to 1 signals that the octet indicates both the TXOP sharing mode bandwidth and the duration of the requested part of the TXOP. For another example, the EOSP subfield carrying a value of 0 when the reserved bit is set to 0 signals that the octet indicates the duration of the requested part of the TXOP, and the EOSP subfield carrying a value of 1 when the reserved bit is set to 0 signals that the octet indicates the queue size of the wireless communication device.

In some other implementations, the MAC header of the frame includes an Aggregated-Control (A-Control) subfield carrying the request. In some instances, the A-Control subfield includes a Control Identification (ID) subfield carrying a reserved value indicating that the frame is a P2P request frame, and includes a Control Information subfield carrying one or more parameters for the P2P communications. The one or more parameters for the P2P communications may include one or more of a duration of the requested part of the TXOP, a requested bandwidth for the P2P communications, a requested start time of a service period associated with the P2P communications, a requested service interval for the P2P communications, a requested type of trigger frame for soliciting the P2P communications, a TID of the P2P communications, an SCSID of the P2P communications, a user priority of a traffic flow associated with the P2P communications, a queue size of the wireless communication device, or a delay bound for the service period associated with the P2P communications. In some aspects, the reserved value carried in the Control ID subfield is one of 9, 11, 12, 13, or 14. In some other instances, the A-Control subfield carries a Control Information subfield including a Delta TID subfield set to a reserved value indicating that the frame is a P2P request frame, and a Queue Size High subfield and a Queue Size All subfield set to values that collectively indicate a duration of the requested part of the TXOP and a requested TXOP sharing mode bandwidth.

In some instances, the frame may be a target wake time (TWT) request frame that includes a TWT Element indicating the MAC address of the client device and one or more TWT parameters of a restricted TWT (r-TWT) service period (SP) associated with the P2P communications. In some other instances, the frame may be an SCS request frame that includes a TSPEC Element indicating the MAC address of the client device and one or more data rate parameters of a r-TWT SP associated with the P2P communications. In various implementations, the trigger frame may be a multi-user (MU) Request-to-Send (RTS) TXOP Sharing (TXS) trigger frame that includes a TXOP sharing mode subfield indicating a TXOP sharing mode for the P2P communications between the wireless communication device and the client device. In some aspects, the trigger frame identifies the wireless communication device and the client device.

In some implementations, the method further includes receiving, from the AP over the wireless medium, a response frame that includes a MAC header carrying an acknowledgement of the request. In some instances, the MAC header of the response frame includes a QoS control field or an A-Control subfield indicating one or more of a duration of the part of the TXOP to be allocated for the P2P communications, a bandwidth to be allocated for the P2P communications, a TID of the P2P communications, an SCSID of the P2P communications, a start time for a service period associated with the P2P communications, a service interval associated with the P2P communications, a delay bound for the service period associated with the P2P communications, or a requested type of trigger frame. In some aspects, the response frame may be a QoS Data frame or a Block Acknowledgement (BA) frame.

In some other implementations, the method further includes transmitting latency-sensitive traffic over the wireless medium to the client device based on receiving the trigger frame from the AP, transmitting a P2P trigger frame over the wireless medium to the client device after transmitting the latency-sensitive traffic to the client device, and receiving latency-sensitive traffic over the wireless medium from the client device based on the P2P trigger frame. In various implementations, the method further includes operating the wireless communication device as a wireless station (STA) associated with the AP while operating the wireless communication device as a softAP which with the client device is associated.

Another innovative aspect of the subject matter described in this disclosure can be implemented in a wireless communication device. The wireless communication device can include at least one modem, at least one processor communicatively coupled with the at least one modem, and at least one memory communicatively coupled with the at least one processor. In some implementations, the at least one memory stores processor-readable code that, when executed by the at least one processor in conjunction with the at least one modem, is configured to transmit a frame over a wireless medium to an AP, the frame including a MAC header carrying a request for the AP to allocate at least part of a TXOP for P2P communications between the wireless communication device and a client device. Execution of the processor-readable code is configured to receive a trigger frame over the wireless medium from the AP, the trigger frame allocating a portion of the TXOP to the wireless communication device for the P2P communications. Execution of the processor-readable code is configured to transmit or receive P2P data to or from the client device over the wireless medium during the allocated portion of the TXOP. In some aspects, the request indicates one or more of a duration of the requested part of the TXOP, a requested bandwidth for the P2P communications, a TID of the P2P communications, an SCSID of the P2P communications, a requested start time of a service period associated with the P2P communications, a requested service interval for the P2P communications, a delay bound for the service period associated with the P2P communications, or a requested type of trigger frame.

In some implementations, the MAC header of the frame includes a QoS control field carrying the request. In some instances, the QoS control field includes a reserved bit set to a value indicating that the frame is a P2P request frame, a TID subfield set to a value indicating that the frame is a P2P request frame, the value being greater than or equal to 8, or an ACK Policy Indicator subfield set to a value indicating that the frame is a P2P request frame. In some aspects, the QoS control field includes an EOSP subfield, an ACK Policy Indicator subfield following the EOSP subfield, a reserved bit following the ACK Policy Indicator subfield, and an octet following the reserved bit, where the octet indicates one or more of a duration of the requested part of the TXOP, a queue size of the wireless communication device, or a TXOP sharing mode bandwidth based on values carried in the EOSP subfield and the reserved bit. For example, the EOSP subfield carrying a value of 0 when the reserved bit is set to 1 signals that the octet indicates the duration of the requested part of the TXOP and signals that the ACK Policy Indicator subfield indicates the TXOP sharing mode bandwidth, and the EOSP subfield carrying a value of 1 when the reserved bit is set to 1 signals that the octet indicates both the TXOP sharing mode bandwidth and the duration of the requested part of the TXOP. For another example, the EOSP subfield carrying a value of 0 when the reserved bit is set to 0 signals that the octet indicates the duration of the requested part of the TXOP, and the EOSP subfield carrying a value of 1 when the reserved bit is set to 0 signals that the octet indicates the queue size of the wireless communication device.

In some other implementations, the MAC header of the frame includes an A-Control subfield carrying the request. In some instances, the A-Control subfield includes a Control ID subfield carrying a reserved value indicating that the frame is a P2P request frame, and includes a Control Information subfield carrying one or more parameters for the P2P communications. The one or more parameters for the P2P communications may include one or more of a duration of the requested part of the TXOP, a requested bandwidth for the P2P communications, a requested start time of a service period associated with the P2P communications, a requested service interval for the P2P communications, a requested type of trigger frame for soliciting the P2P communications, a TID of the P2P communications, an SCSID of the P2P communications, a user priority of a traffic flow associated with the P2P communications, a queue size of the wireless communication device, or a delay bound for the service period associated with the P2P communications. In some aspects, the reserved value carried in the Control ID subfield is one of 9, 11, 12, 13, or 14. In some other instances, the A-Control subfield carries a Control Information subfield including a Delta TID subfield set to a reserved value indicating that the frame is a P2P request frame, and a Queue Size High subfield and a Queue Size All subfield set to values that collectively indicate a duration of the requested part of the TXOP and a requested TXOP sharing mode bandwidth.

In some instances, the frame may be a TWT request frame that includes a TWT Element indicating the MAC address of the client device and one or more TWT parameters of an r-TWT SP associated with the P2P communications. In some other instances, the frame may be an SCS request frame that includes a TSPEC Element indicating the MAC address of the client device and one or more data rate parameters of a r-TWT SP associated with the P2P communications. In various implementations, the trigger frame may be an MU-RTS TXS trigger frame that includes a TXOP sharing mode subfield indicating a TXOP sharing mode for the P2P communications between the wireless communication device and the client device. In some aspects, the trigger frame identifies the wireless communication device and the client device.

In some implementations, execution of the processor-readable code may also be configured to receive, from the AP over the wireless medium, a response frame that includes a MAC header carrying an acknowledgement of the request. In some instances, the MAC header of the response frame includes a QoS control field or an A-Control subfield indicating one or more of a duration of the requested part of the TXOP, a bandwidth to be allocated for the P2P communications, a TID of the P2P communications, an SCSID of the P2P communications, a start time for a service period associated with the P2P communications, a service interval associated with the P2P communications, a delay bound for the service period associated with the P2P communications, or a requested type of trigger frame. In some aspects, the response frame may be a QoS Data frame or a BA frame.

In some other implementations, execution of the processor-readable code may also be configured to transmit latency-sensitive traffic over the wireless medium to the client device based on receiving the trigger frame from the AP, to transmit a P2P trigger frame over the wireless medium to the client device after transmitting the latency-sensitive traffic to the client device, and to receive latency-sensitive traffic over the wireless medium from the client device based on the P2P trigger frame. In various implementations, execution of the processor-readable code may also be configured to operate the wireless communication device as a STA associated with the AP while operating the wireless communication device as a softAP which with the client device is associated.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 14A shows a table describing the contents and bit assignments of the Quality-of-Service (QoS) Control field of FIG. 13 for a plurality of different frame types and subtypes.

FIG. 14B shows an example structure of a QoS Control field usable for wireless communications, according to some implementations.

Like reference numbers and designations in the various drawings indicate like elements.

DETAILED DESCRIPTION

Figure 1:
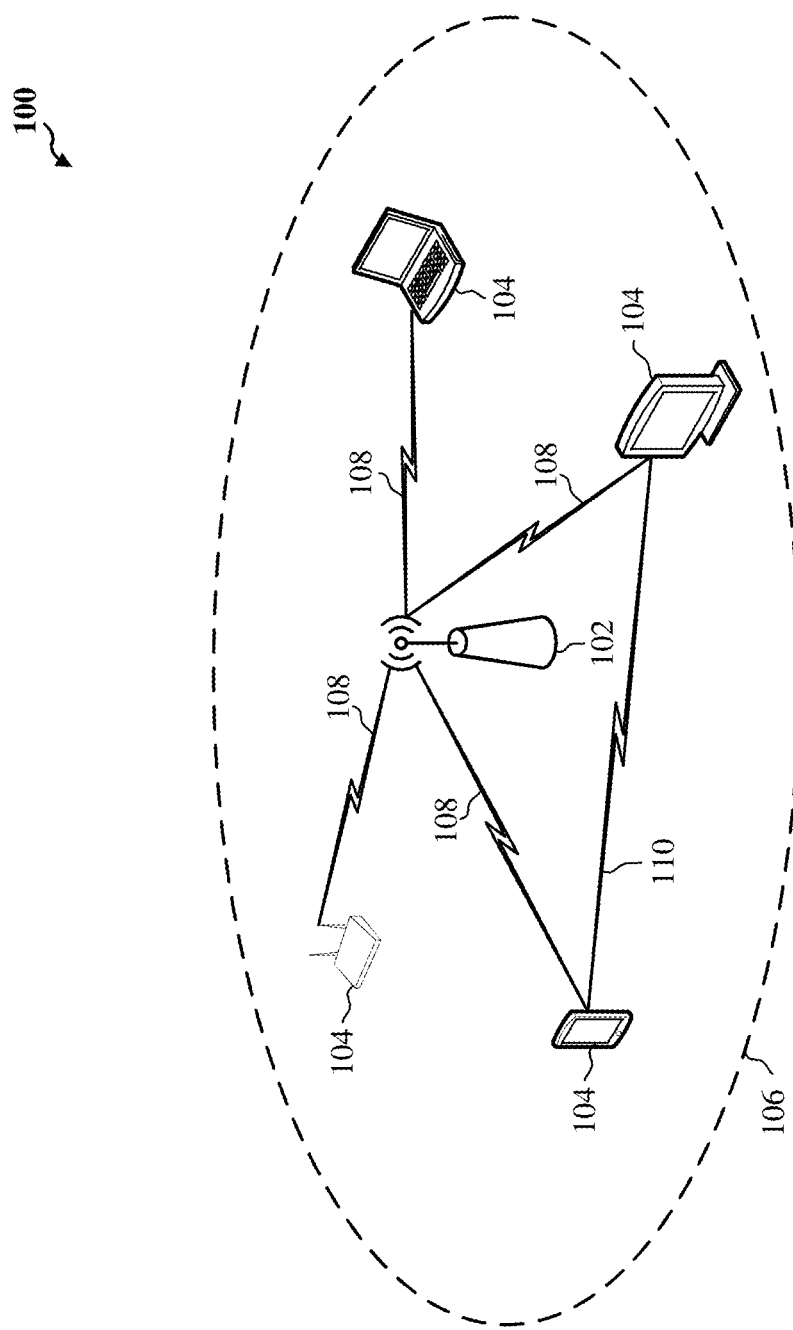
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Many wireless networks use random channel access mechanisms to control access to a shared wireless medium. In these wireless networks, wireless communication devices (including access points (APs) and wireless stations (STAs)) contend with one another using carrier sense multiple access with collision avoidance (CSMA/CA) techniques to gain access to the wireless medium. In general, the wireless communication device that randomly selects the lowest back-off number (RBO) wins the medium access contention operation and may be granted access to the wireless medium for a period of time commonly referred to as a transmit opportunity (TXOP). Other wireless communication devices are generally not permitted to transmit during the TXOP of another wireless communication device to avoid collisions on the shared wireless medium.

Some random channel access mechanisms, such as enhanced distributed channel access (EDCA), afford high-priority traffic a greater likelihood of gaining medium access than low-priority traffic. EDCA classifies data into different access categories (ACs) such as, for example, voice (AC_VO), video (AC_VI), best effort (AC_BE), and background (AC_BK). Each AC is associated with a different priority level and may be assigned a different range of RBOs so that higher priority data is more likely to win a TXOP than lower priority data (such as by assigning lower RBOs to higher priority data and assigning higher RBOs to lower priority data). Although EDCA increases the likelihood that low-latency data traffic will gain access to a shared wireless medium during a given contention period, unpredictable outcomes of medium access contention operations may prevent low-latency applications from achieving certain levels of throughput or satisfying certain latency requirements.

The IEEE 802.11be amendment of the IEEE 802.11 standard describes a restricted target wake time (TWT) service period (SP) that can be used to provide more predictable latency, reduced worst case latency, or reduced jitter, with higher reliability for latency-sensitive traffic. As used herein, the term "non-legacy STA" may refer to any STA that supports restricted TWT operation, while the term "low-latency STA" may refer to any non-legacy STA that has latency-sensitive traffic to send or receive. In contrast, the term "legacy STA" may refer to any STA that does not support restricted TWT operation. The IEEE 802.11be amendment requires all non-legacy STAs that are TXOP holders outside of any restricted TWT SP (r-TWT SP) for which they are not a member ("non-member STAs") to end their respective TXOPs before the start of the r-TWT SP. Although membership in a r-TWT SP may be reserved exclusively for low-latency STAs, the current rules regarding r-TWT SPs do not prevent non-member STAs from acquiring a TXOP during a r-TWT SP. As a result, some non-member STAs may gain access to a shared wireless medium, during a r-TWT SP, even before the members of the r-TWT SP are able to obtain channel access.

Some latency-sensitive traffic may be exchanged between wireless devices using peer-to-peer (P2P) communications. For example, a wireless communication device, such as a non-AP STA, executing a real-time gaming application may operate as a STA that transmits and receives gaming data to and from a gaming service via an associated AP via an access link, while also operating as a softAP that transmits and receives gaming data to and from an associated AR/VR headset (or another suitable client device) via a P2P link. While the wireless communication device is executing the real-time gaming application, the P2P communications between the STA and the AR/VR headset may be subject to the latency, throughput, and timing requirements associated with the gaming application. Similarly, gaming data transmitted between the STA and the associated AP may also be subject to the latency, throughput, and timing requirements associated with the gaming application. Although latency-sensitive traffic may be afforded enhanced channel protection using r-TWT SPs, real-time gaming traffic (and other types of latency-sensitive traffic) may benefit from an ability to dynamically request additional wireless resources from the associated AP. For example, if the STA executing the real-time gaming application admits additional players to the gaming application, the amount of gaming data transmitted to (and received from) the STA may suddenly increase and require additional resources to avoid violating the latency, throughput, and timing requirements associated with the gaming application.

Various aspects of the subject matter disclosed herein relate generally to wireless communications associated with latency-sensitive applications, and specifically, to providing dynamic channel access to low-latency STAs to meet the various latency, throughput, and timing requirements of such latency-sensitive applications. In some aspects, a low-latency STA, such as a smartphone or other client device, may transmit, to an associated AP, a frame including a Medium Access Control (MAC) header carrying a request for the AP to allocate at least part of a TXOP, obtained by the AP, for P2P or other latency-sensitive communications between the low-latency STA and another client device, such as an AR/VR headset. The request may indicate one or more of a duration of the requested part of the TXOP, a requested bandwidth for the P2P communications, a Traffic Identifier (TID) of the P2P communications, a Stream Classification Service (SCS) identifier (SCSID) of the P2P communications, a requested start time of a service period associated with the P2P communications, a requested service interval for the P2P communications, a delay bound for the service period associated with the P2P communications, or a requested type of trigger frame. The AP may acknowledge the request by transmitting a response frame including a MAC header that carries an acknowledgement of the request. In some instances, the MAC header of the response frame may include a Quality-of-Service (QoS) Control field or an Aggregated-Control (A-Control) subfield indicating the duration of the requested part of the TXOP, the bandwidth to be allocated for the P2P communications, the TID of the P2P communications, the SCSID of the P2P communications, the start time for a service period associated with the P2P communications, the service interval associated with the P2P communications, the delay bound for the service period, the requested type of trigger frame, or any combination thereof.

The AP may then transmit a trigger frame allocating a portion (which may be the requested portion) of the TXOP to the low-latency STA for the P2P communications. In some instances, the trigger frame may be a multi-user (MU) Request-to-Send (RTS) TXOP Sharing (TXS) trigger frame that includes a TXOP sharing mode subfield indicating a TXOP sharing mode for the P2P communications between the low-latency STA and the other client device. The low-latency STA may receive the trigger frame and transmit or receive P2P data to or from the client device over the wireless medium during the allocated portion of the TXOP. In some instances, the low-latency STA and the client device may exchange the P2P data using a P2P link or a link that is in accordance with the Wi-Fi Direct protocol.

Particular implementations of the subject matter described in this disclosure can be implemented to realize one or more of the following potential advantages. By enabling a wireless communication device, such as a low-latency STA (for example, a smartphone), to dynamically request additional wireless resources for latency-sensitive communications with a client device (such as an AR/VR headset), aspects of the present disclosure may ensure that the wireless communication device and its associated client device may be dynamically allocated sufficient channel access to meet the various latency, throughput, and timing requirements associated with the real-time application. Also, by allowing resource allocation requests to be carried in the MAC header of frames, such as QoS Null and QoS Data frames, aspects of the present disclosure may enable the wireless communication device to dynamically send such requests to the AP, for example, based on real-time changes in the resources needed to meet the various latency, throughput, and timing requirements associated with the real-time application.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
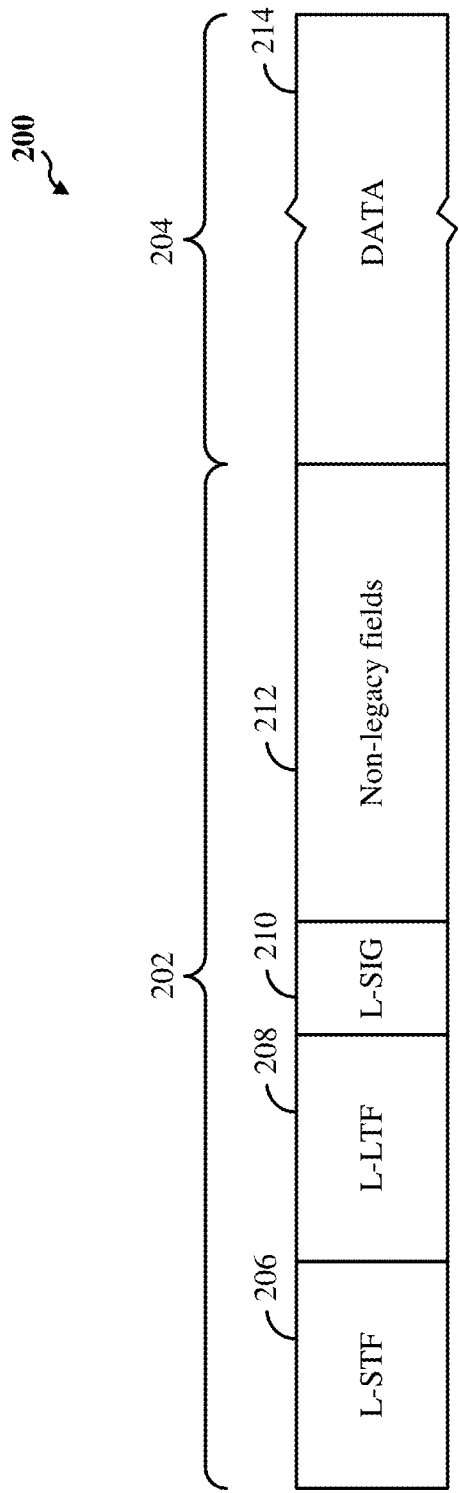
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 also may include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
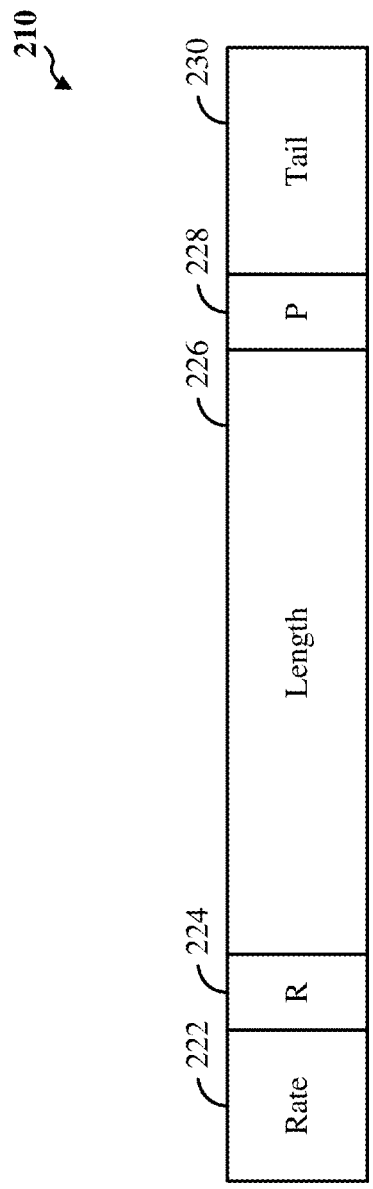
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
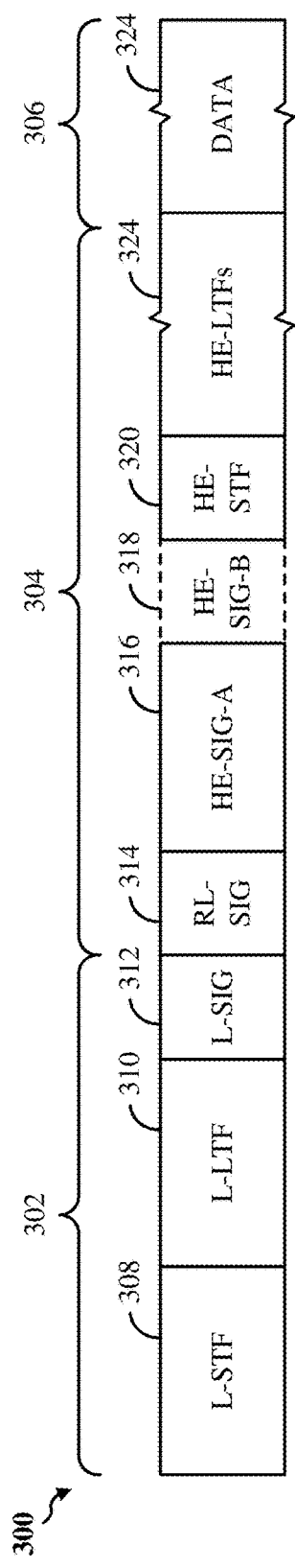
FIG. 3A shows another example PDU usable for communications between an AP and one or more STAs.

FIG. 3A shows another example PDU 300 usable for wireless communication between an AP and one or more STAs. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the non-legacy portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-B 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
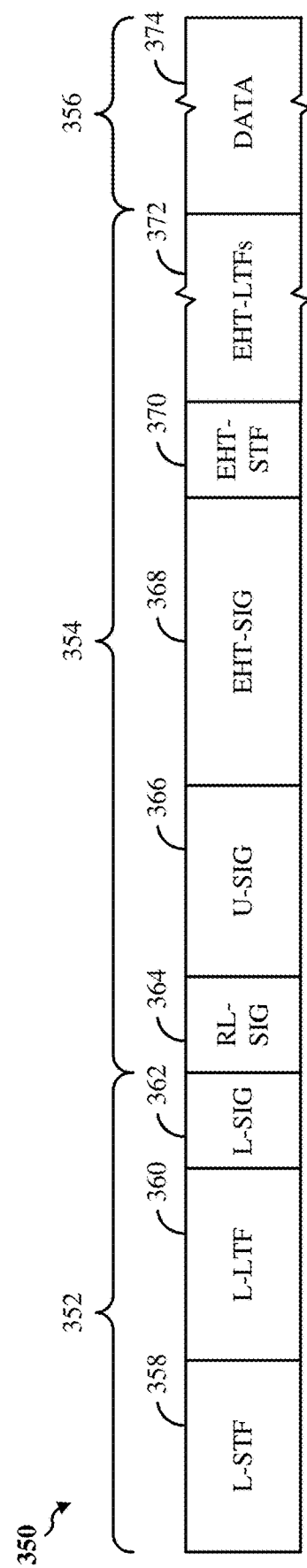
FIG. 3B shows another example PDU usable for communications between an AP and one or more STAs.

FIG. 3B shows another example PPDU 350 usable for wireless communication between an AP and one or more STAs. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 376.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 372 (referred to herein as "EHT-STF 372," although it may be structured as, and carry version-dependent information for, other wireless communication protocol versions beyond EHT) and one or more additional long training fields 374 (referred to herein as "EHT-LTFs 374," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 376. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 376. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 376.

Figure 4:
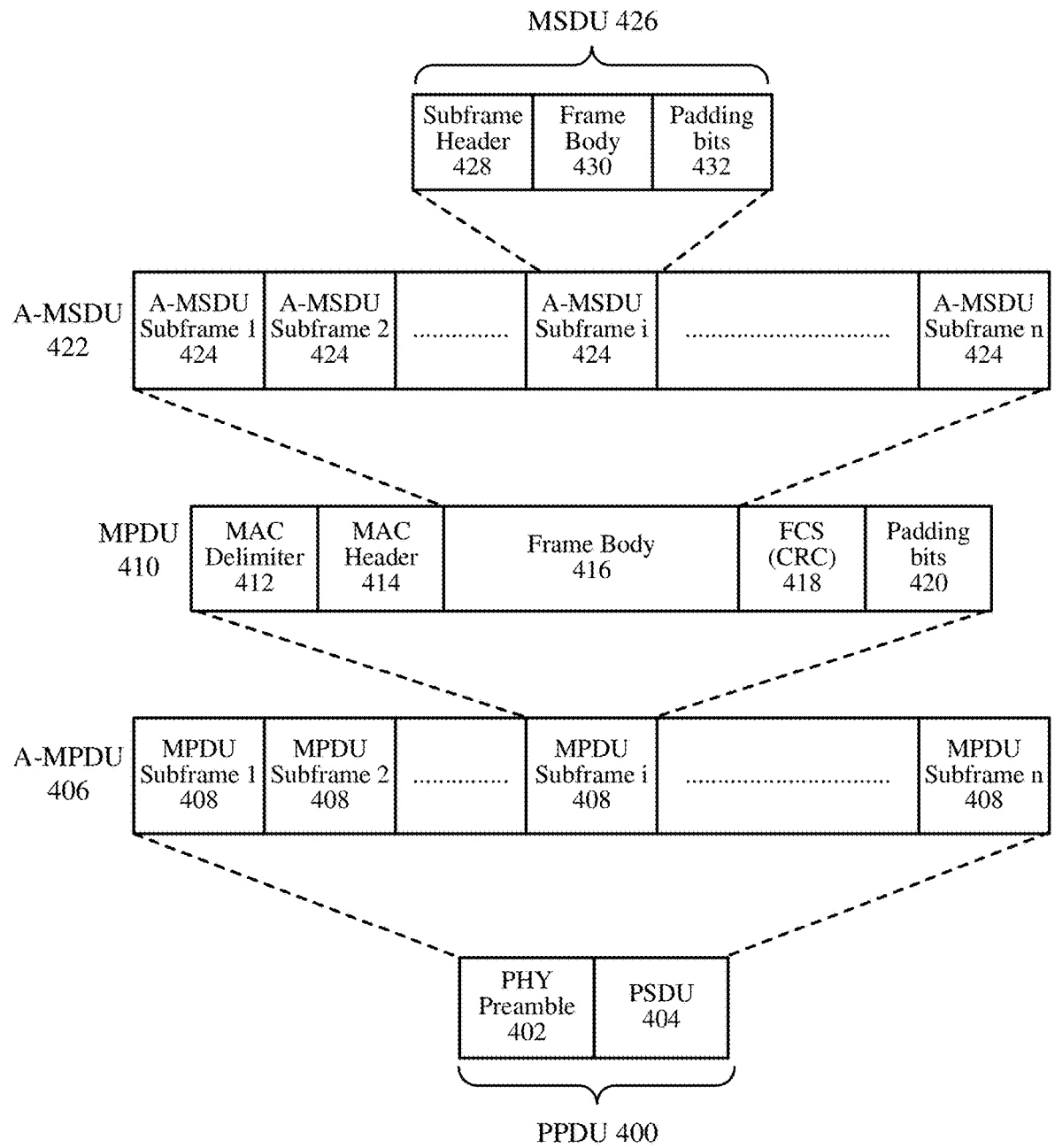
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs), for example, such as an aggregated MPDU (A-MPDU) 406 that includes multiple MPDU subframes 408. Each MPDU subframe 408 may include a MAC delimiter 412 and a MAC header 414 prior to the accompanying frame body 416, which includes the data portion or "payload" of the MPDU subframe 408. The frame body 416 may carry one or more MAC service data units (MSDUs), for example, such as an aggregated MSDU (A-MSDU) 422 that includes multiple MSDU subframes 424. Each MSDU subframe 424 contains a corresponding MSDU 426 including a subframe header 428, a frame body 430, and one or more padding bits 432.

Referring back to the A-MPDU subframe 406, the MAC header 414 may include a number of fields containing information that defines or indicates characteristics or attributes of data encapsulated within the frame body 416. The MAC header 414 also includes a number of fields indicating addresses for the data encapsulated within the frame body 416. For example, the MAC header 414 may include a combination of a source address, a transmitter address, a receiver address, or a destination address. The MAC header 414 may include a frame control field containing control information. The frame control field specifies the frame type, for example, a data frame, a control frame, or a management frame. The MAC header 414 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 408 may also include a frame check sequence (FCS) field 418 for error detection. For example, the FCS field 418 may include a cyclic redundancy check (CRC), and may be followed by one or more padding bits 420.

As described above, APs 102 and STAs 104 can support multi-user (MU) communications. That is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
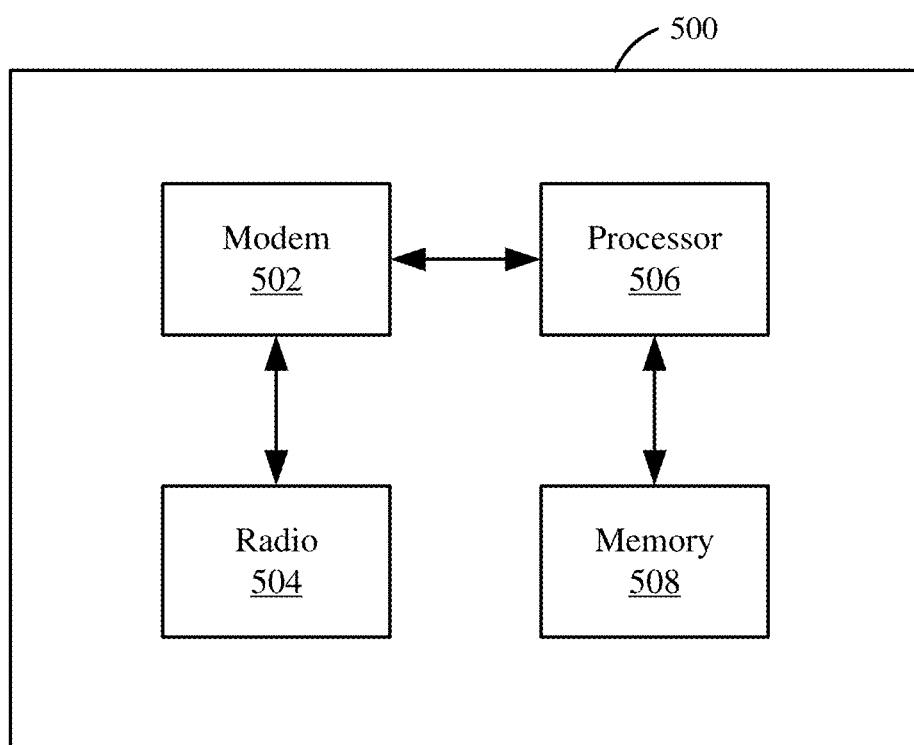
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device 500 can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 500 can be, or can include, a chip, system on chip (SoC), chipset, package, or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 500 further includes one or more processors, processing blocks or processing elements (collectively "the processor 506"), and one or more memory blocks or elements (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer, and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation, or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 6B:
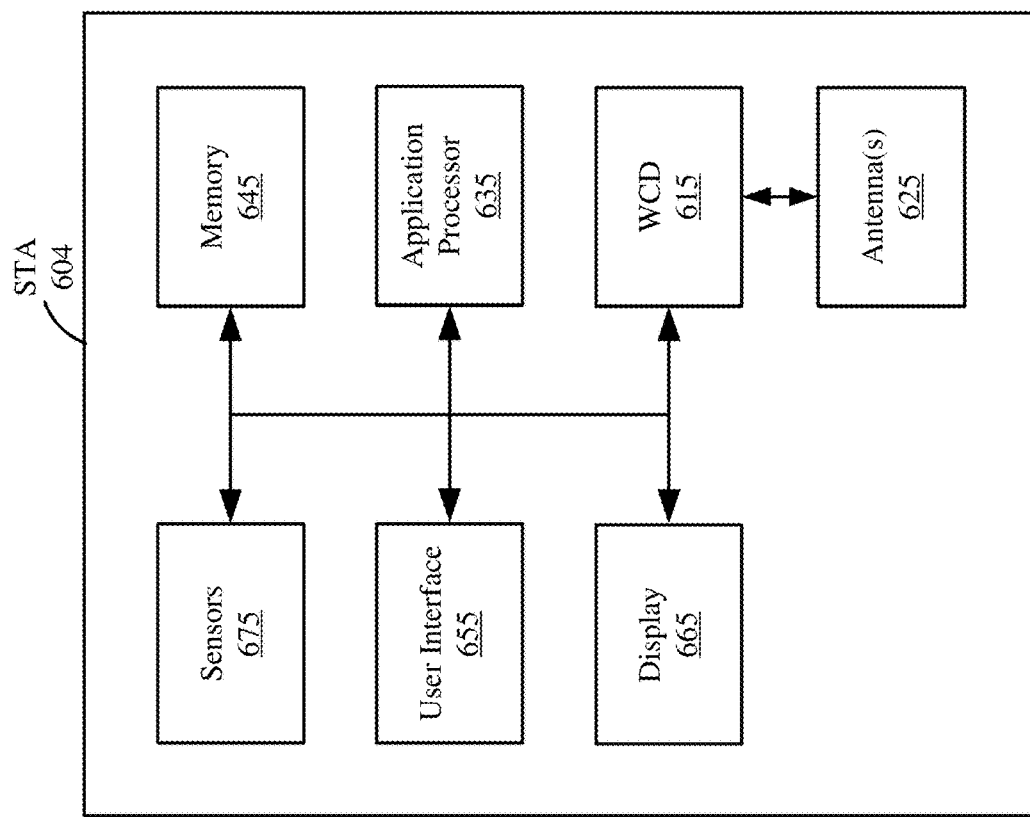
FIG. 6B shows a block diagram of an example station (STA).
Figure 6A:
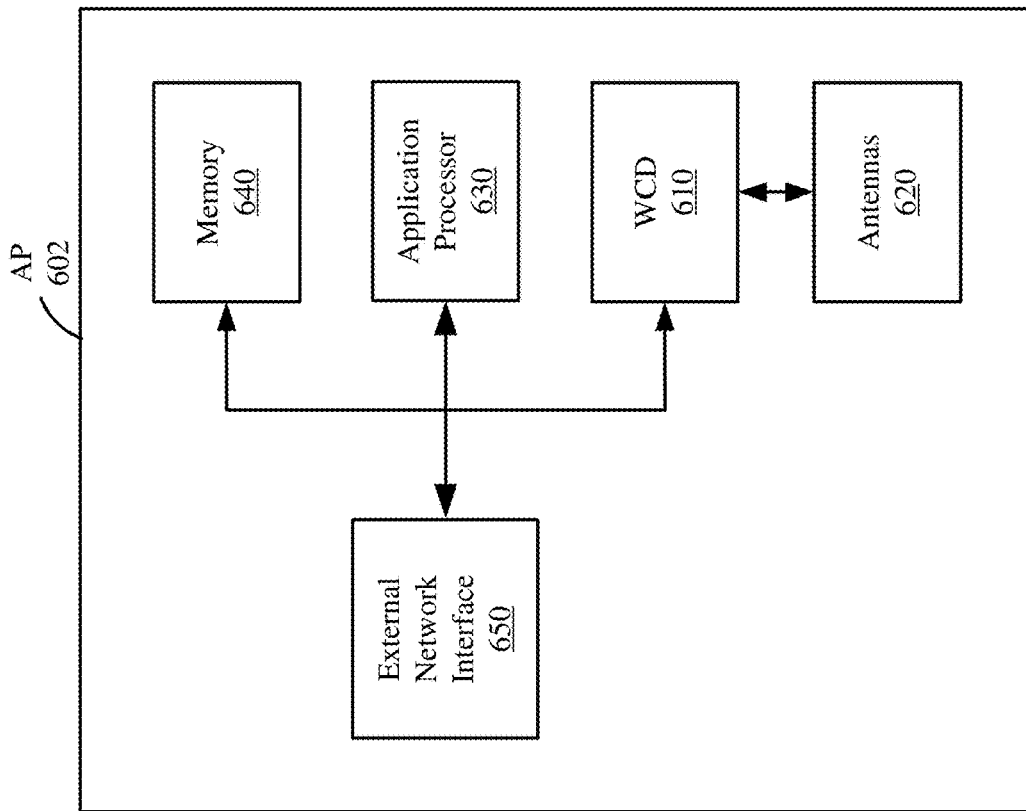
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

As discussed, various aspects of the subject matter disclosed herein relate generally to P2P communications, and more particularly, to ensuring that P2P communications associated with latency-sensitive applications are provided with dynamic channel access to meet the various latency, throughput, and timing requirements of such latency-sensitive applications. For example, a wireless communication device executing a real-time gaming application may operate as a STA that transmits and receives gaming data to and from a gaming service via an associated with AP while also operating as a softAP that transmits and receives gaming data to and from an associated AR/VR headset. In some implementations, the wireless communication device may transmit a frame including a MAC header carrying a request for the AP to allocate a portion of a TXOP obtained on the wireless medium for P2P communications between the wireless communication device and the client device. The request may also indicate or request one or more timing and/or bandwidth parameters for the P2P communications. In some instances, the frame may be a QoS Null frame or a QoS Data frame. The AP may acknowledge the request, and transmit a trigger frame allocating the portion of the TXOP to the wireless communication device for the P2P communications. The wireless communication device may receive the trigger frame, and thereafter transmit or receive P2P data to or from the client device over the wireless medium during the allocated portion of the TXOP.

Particular implementations of the subject matter described in this disclosure can be implemented to realize one or more of the following potential advantages. By allowing a wireless communication device executing a real-time application and associated with a client device (such as an AR/VR headset) to dynamically request additional wireless resources for P2P communications with the client device, aspects of the present disclosure may ensure the wireless communication device and its associated client device are dynamically allocated channel access to meet the various latency, throughput, and timing requirements associated with the real-time application. Also, by allowing requests for the AP to allocate a portion of a TXOP obtained on the wireless medium for P2P communications to be carried in the MAC header of frames such as QoS Null and QoS Data frames, aspects of the present disclosure may allow the wireless communication device to dynamically send such requests to the AP, for example, based on real-time changes in the bandwidth needed to meet the various latency, throughput, and timing requirements associated with the real-time application.

Figure 7:
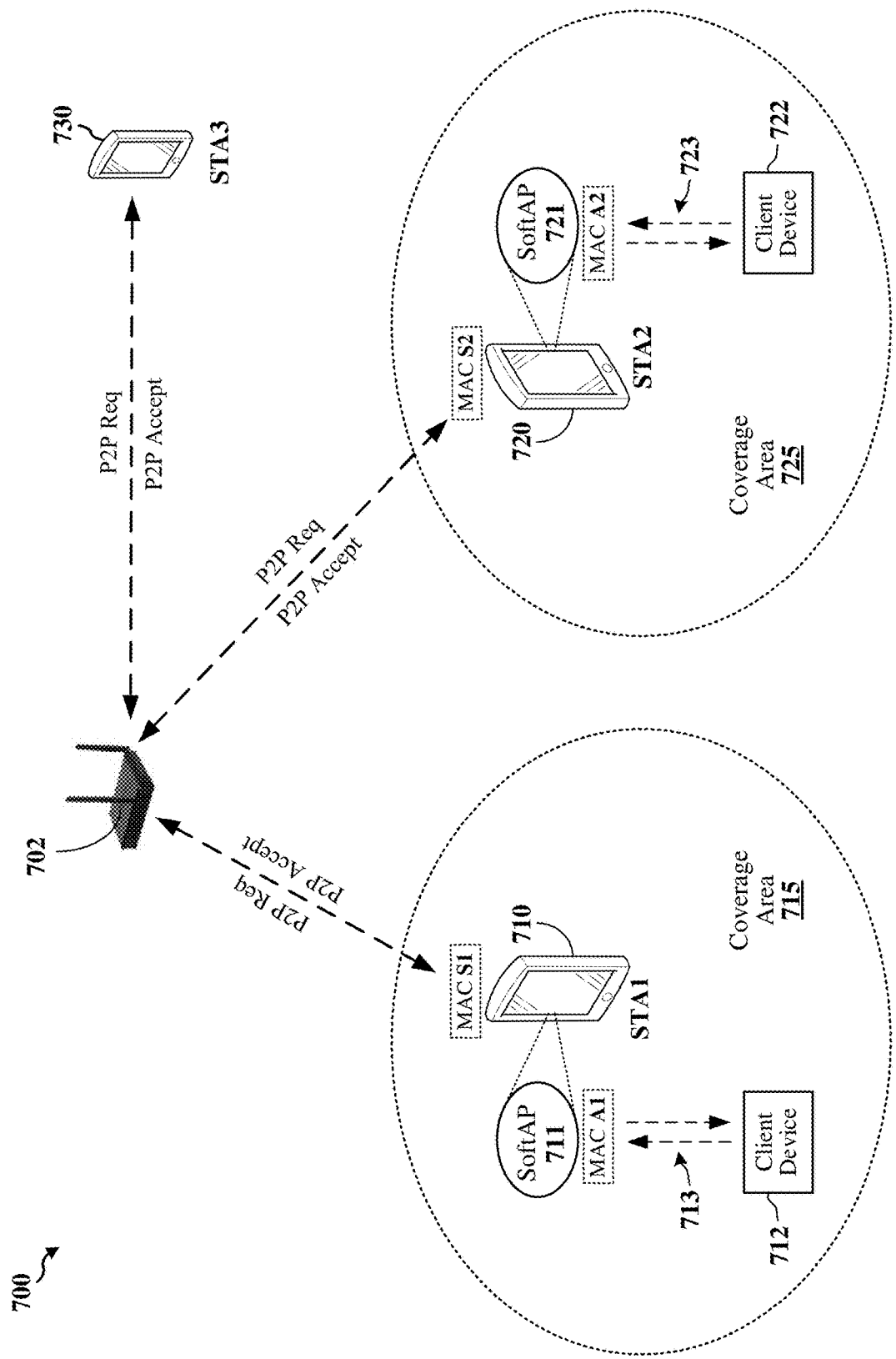
FIG. 7 shows a pictorial diagram of another example wireless network, according to some implementations.

FIG. 7 shows a block diagram of another example wireless network 700, according to some implementations. In some aspects, the wireless network 700 can be an example of the WLAN 100 of FIG. 1. The wireless network 700 is shown to include an AP 702, a first wireless station (STA) 710, a second STA 720, and a third STA 730. In some implementations, the AP 702 may be one example of the AP 102 of FIG. 1 or the AP 602 of FIG. 6A, and may operate a BSS on a wireless medium according to one or more versions of the IEEE 802.11 family of wireless communication standards. The STAs 710, 720, and 730 may be examples of the STAs 104 of FIG. 1, the wireless communication device 500 of FIG. 5, or the STA 604 of FIG. 6B. The STAs 710, 720, and 730 are associated with the AP 702, and may communicate with the AP 702 on the wireless medium in accordance with the BSS operated by the AP 702.

In the example of FIG. 7, the first STA 710 is collocated with a first softAP 711 that is associated with a first client device 712, and the second STA 720 is collocated with a second softAP 721 that is associated with a second client device 722. The first softAP 711 and the first client device 712 may establish a P2P link 713 over which P2P communications can be exchanged between the first softAP 711 and client device 712. The second softAP 721 and the second client device 722 may establish a P2P link 723 over which P2P communications can be exchanged between the second softAP 721 and client device 722. In some instances, the P2P links 713 and 723 may be tunneled direct-link setup (TDLS) links established on the wireless medium. In other instances, the P2P links 713 and 723 may be based on the Wi-Fi Direct peer-to-peer communication protocol.

In some implementations, the first STA 710 includes separate MAC entities that can independently perform MAC layer functions for wireless communications with the AP 702 and MAC layer functions for wireless communications with the client device 712. For example, the first STA 710 may include a first MAC service access point (MAC-SAP) endpoint (S1) corresponding to the first STA 710, and may include a second MAC-SAP endpoint (A1) corresponding to the first softAP 711. The first MAC-SAP endpoint S1 may be responsible for decoding frames and packets received over the wireless medium from the AP 702, and may be responsible for constructing and formatting frames for transmission over the wireless medium from the first STA 710 to the AP 702. The second MAC-SAP endpoint A1 may be responsible for decoding frames and packets received over the first P2P link 713 from the client device 712, and may be responsible for constructing and formatting frames for transmission from the first softAP 711 to the client device 712 over the first P2P link 713. In some instances, the MAC-SAP endpoints S1 and A1 may have different MAC addresses.

Similarly, the second STA 720 may include a first MAC-SAP endpoint (S2) corresponding to the second STA 720, and may include a second MAC-SAP endpoint (A2) corresponding to the second softAP 721. The first MAC-SAP endpoint S2 may be responsible for decoding frames and packets received over the wireless medium from the AP 702, and may be responsible for constructing and formatting frames for transmission over the wireless medium from the second STA 720 to the AP 702. The second MAC-SAP endpoint A2 may be responsible for decoding frames and packets received over the second P2P link 723 from the client device 722, and may be responsible for constructing and formatting frames for transmission from the second softAP 721 to the client device 722 over the second P2P link 723. In some instances, the MAC-SAP endpoints S2 and A2 may have different MAC addresses.

The first STA 710 may provide a first coverage area 715 for P2P devices such as the first client device 712, and the second STA 720 may provide a second coverage area 725 for P2P devices such as the second client device 722. In some instances, the first and second coverage areas 715 and 725 may not overlap with each other (as depicted in the example of FIG. 7). In some other instances, the first and second coverage areas 715 and 725 may overlap with each other. Although not shown for simplicity, the coverage area provided by the AP 702 may include some or all of the first coverage area 715 provided by the first softAP 711 of the first STA 710, and may include some or all of the second coverage area 725 provided by the second softAP 721 of the second STA 720. For example, in some instances, one or both of the client devices 712 and 722 may be able to receive and successfully decode frames transmitted by the AP 702, while in other instances, one or both of the client devices 712 and 722 may not be able to receive and successfully decode frames transmitted by the AP 702 (such as because the client devices 712 and 722 are not within the wireless coverage area of the AP 702).

The client devices 712 and 722 can be any suitable devices that can establish P2P links with respective softAPs 711 and 721. In the example of FIG. 7, the client devices 712 and 722 are associated with low-latency applications having strict end-to-end latency, throughput, and timing requirements for data traffic. In some instances, the client devices 712 and 722 may be associated with real-time gaming applications, video communications, or augmented reality (AR) and virtual reality (VR) applications (collectively referred to as extended reality (XR) applications). For example, the client devices 712 and 722 may be AR/VR headsets associated with the softAPs 711 and 721 collocated with the first and second STAs 710 and 720, respectively. In some instances, each of the first STA 710 and the second STA 720 may be referred to as a low-latency STA. In instances for which the third STA 730 is associated with latency-sensitive traffic, the third STA 730 may also be referred to as a low-latency STA.

As discussed, low-latency applications may specify various latency, throughput, and timing requirements for the wireless network 700, and therefore it is desirable to ensure that the wireless network 700 is able to meet the various latency, throughput, and timing requirements of such low-latency applications. In some implementations, each of the first STA 710 and the second STA 720 can transmit a frame including a request for the AP 702 to allocate a portion of a TXOP obtained on the wireless medium for P2P communications between the respective STA and a client device. In some instances, the request for the AP to allocate the portion of the TXOP for the P2P communications may be carried in the MAC header of the frame. The request may indicate one or more of a duration of the requested part of the TXOP, a requested bandwidth for the P2P communications, a traffic identifier (TID) of the P2P communications, a Stream Classification Service (SCS) identifier (SCSID) of the P2P communications, a requested start time of a service period associated with the P2P communications, a requested service interval for the P2P communications, a delay bound for the service period associated with the P2P communications, or a requested type of trigger frame.

After receiving the P2P requests carried in the MAC headers of the frames, the AP 702 may determine whether to accept or decline the request, and may also determine whether to accept, decline, or modify one or more of the parameters indicated in the requests. Specifically, the AP 702 sends a response frame to each of the first STA 710 and the second STA 720 to acknowledge reception of their P2P requests. In some instances, the MAC header of each response frame includes an acknowledgement of the corresponding request. The MAC header of each response frame may also include a QoS Control field or an Aggregated-Control (A-Control) subfield indicating one or more of the duration of the part of the TXOP to be allocated for the P2P communications, the bandwidth to be allocated for the P2P communications, the TID of the P2P communications, the SCSID of the P2P communications, the start time for a service period associated with the P2P communications, the service interval associated with the P2P communications, the delay bound for the service period associated with the P2P communications, or the requested type of trigger frame.

The AP 702 obtains a TXOP on the wireless medium, and transmits a trigger frame to the first STA 710 and the second STA 720. The trigger frame may allocate the requested portion of the TXOP to one or both of the first STA 710 and the second STA 720 for P2P communications with their respective client devices. In some instances, the AP 702 may allocate different portions of the TXOP to the first STA 710 and the second STA 720 (such as during different service periods associated with the P2P communications). Thereafter, the first STA 710 and the second STA 720 may exchange P2P data with their respective client devices during the portion of the TXOP allocated for P2P communications by the AP 702.

Figure 8:
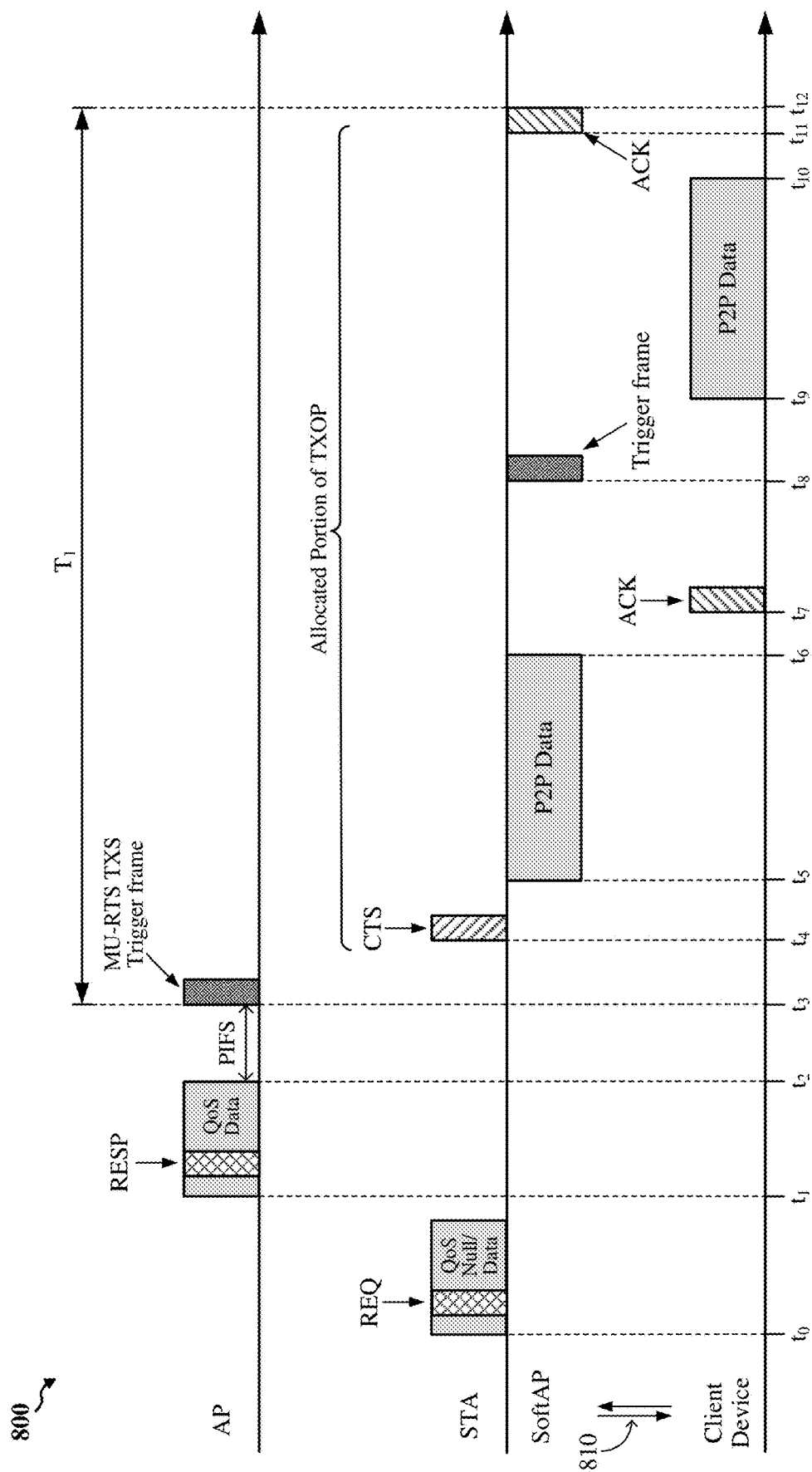
FIG. 8 shows a timing diagram depicting an example of wireless communication that supports requests to allocate wireless medium resources for latency-sensitive peer-to-peer (P2P) traffic, according to some implementations.

FIG. 8 shows a timing diagram depicting an example wireless communication 800 that supports requests to allocate wireless medium resources for latency-sensitive P2P traffic, according to some implementations. The timing diagram is shown to include an AP, a STA, and a client device. In some implementations, the AP may be one example of the AP 702 of FIG. 7, the STA may be one example of the first STA 710 or the second STA 720 of FIG. 7, and the client device may be one example of respective client devices 712 and 722 of FIG. 7. In some other implementations, the AP may be one example of the AP 102 or the AP 602 of FIGS. 1 and 6A, respectively, and the STA may be one example of the STAs 104 or the STA 604 of FIGS. 1 and 6B, respectively. Although only one STA and one client device are shown in the example of FIG. 8, in actual implementations, the BSS operated by the AP may include any suitable number of STAs, and one or more of the STAs may include or implement a softAP that can exchange latency-sensitive P2P communications with one or more associated client devices.

As discussed with reference to FIG. 7, the STA is associated with the AP, and implements or operates a softAP with which the client device is associated via a P2P link 810. In some instances, the STA may include two MAC-SAP endpoints S1 and A1 (not shown in FIG. 8 for simplicity). The first MAC-SAP endpoint S1 may be responsible for decoding frames and packets received over the wireless medium from the AP, and may be responsible for constructing and formatting frames for transmission over the wireless medium from the STA to the AP. The second MAC-SAP endpoint A1 may be responsible for decoding frames and packets received over the P2P link 810 from the client device, and may be responsible for constructing and formatting frames for transmission from the softAP to the client device over the P2P link 810. In some instances, the MAC-SAP endpoints of the STA may have different MAC addresses.

In some implementations, the STA may be associated with a low-latency application having strict end-to-end latency, throughput, and timing requirements for data traffic. Example low-latency applications include, but are not limited to, real-time gaming applications, video communications, and augmented reality (AR) and virtual reality (VR) applications (collectively referred to as extended reality (XR) applications). In some instances, the STA may utilize peer-to-peer (P2P) communications to exchange latency-sensitive traffic with the client device (which may be an AR/VR headset). For example, in some aspects, the STA may be executing a real-time gaming application that transmits and receives gaming data to and from a gaming service via an associated AP while also operating as a softAP that transmits and receives gaming data to and from an associated AR/VR headset via a P2P link. The P2P communications between the STA (or softAP) and the AR/VR headset may be subject to the latency, throughput, and timing requirements associated with the real-time gaming application. Similarly, gaming data transmitted between the STA and the AP may also be subject to the latency, throughput, and timing requirements associated with the real-time gaming application.

Prior to time to, the STA may determine that additional wireless resources are needed. For example, while executing the real-time gaming application, the STA may manage or at least monitor downlink (DL) transmissions from the AP to the STA and related P2P transmissions from the STA to the client device, and may manage or at least monitor P2P transmissions from the client device to the STA and related uplink (UL) transmissions from the STA to the AP. As such, the STA may be able to determine when additional wireless resources are needed to meet the various latency, throughput, and timing requirements associated with the real-time gaming application, and more specifically, may be able to dynamically request additional wireless resources for latency-sensitive communications associated with the real-time gaming application.

At time to, the STA transmits, over the wireless medium to the AP, a frame including a MAC header that carries a request (REQ) for the AP to allocate a portion of a TXOP obtained on the wireless medium for P2P communications between the STA and the client device. The frame may be a QoS Null frame, a QoS Data frame, a PS Poll frame, or any other suitable frame that includes a MAC header within which the request can be sent to the AP. The request carried in the MAC header of the frame may indicate one or more of a duration of the requested part of the TXOP, a requested bandwidth for the P2P communications, a TID of the P2P communications, a SCSID of the P2P communications, a requested start time of a service period associated with the P2P communications, a requested service interval for the P2P communications, a delay bound for the service period associated with the P2P communications, or a requested type of trigger frame.

In some implementations, the request may be carried in a QoS Control field of the MAC header of the frame. In some instances, the MAC header may include an indication that the frame is to be interpreted as a P2P request frame carrying a request for the AP to transmit an MU-RTS TXS trigger frame allocating a portion of the TXOP to the STA for P2P communications. For example, the QoS Control field may include a reserved bit set to a value indicating that the frame is a P2P request frame, a TID subfield set to a value indicating that the frame is a P2P request frame (the value being greater than or equal to 8), or an ACK Policy Indicator subfield set to a value indicating that the frame is a P2P request frame.

In some instances, the QoS Control field may include an EOSP subfield preceding the ACK Policy Indicator subfield, and may include a TXOP Duration Requested subfield following the reserved bit. The TXOP Duration Requested subfield, which may correspond to the last octet of the QoS Control field, may carry or indicate one or more of the duration of the requested part of the TXOP, the queue size of the STA, or the TXOP sharing mode bandwidth based on values carried in the EOSP subfield and the reserved bit. For example, setting the EOSP subfield to 0 while setting the reserved bit to 1 may signal that the TXOP Duration Requested subfield carries or indicates the duration of the requested part of the TXOP and that the ACK Policy Indicator subfield carries or indicates the TXOP sharing mode bandwidth, and setting the EOSP subfield to 1 while setting the reserved bit to 1 may signal that the TXOP Duration Requested subfield carries or indicates both the TXOP sharing mode bandwidth and the duration of the requested part of the TXOP. For another example, setting the EOSP subfield to 0 while setting the reserved bit to 0 may signal that the TXOP Duration Requested subfield carries or indicates the duration of the requested part of the TXOP, and setting the EOSP subfield set to 1 while setting the reserved bit to 0 may signal that the TXOP Duration Requested subfield carries or indicates the queue size of the STA.

In some other implementations, the request may be carried in an A-Control subfield of the MAC header of the frame. The A-Control subfield, which may be an HE variant HT Control field, may include a Control ID subfield and a Control Information subfield. In some instances, the Control ID subfield is set to a reserved value indicating that the frame is a P2P request frame, and the Control Information subfield carries or indicates various parameters associated with the P2P communications. For example, in some aspects, the reserved value carried in the Control ID subfield may be one of 9, 11, 12, 13, or 14. As discussed, the various parameters may include one or more of the duration of the requested part of the TXOP, the requested bandwidth for the P2P communications, a requested start time of a service period associated with the P2P communications, a requested service interval for the P2P communications, a requested type of trigger frame for soliciting the P2P communications, the TID of the P2P communications, the SCSID of the P2P communications, the user priority of a traffic flow associated with the P2P communications, the queue size of the STA, or the delay bound for the service period associated with the P2P communications.

In some other instances, the Control Information subfield may include a Buffer Status Report (BSR) Control subfield indicating that the frame is a P2P request frame and carrying the duration of the requested part of the TXOP and the requested bandwidth for the TXOP sharing mode. For example, in some aspects, the BSR Control subfield may include a Delta TID subfield, a Queue Size High subfield, and a Queue Size All subfield. The Delta TID subfield may be set to a value indicating that the frame is a P2P request frame, and Queue Size High and Queue Size All subfields may carry values that collectively indicate the duration of the requested part of the TXOP and the requested bandwidth for the TXOP sharing mode.

In some implementations, the frame may be a TWT request frame that includes a TWT Element indicating the MAC address of the client device and one or more TWT parameters of a restricted TWT (r-TWT) service period (SP) associated with the P2P communications. In some other implementations, the frame may be an SCS request frame that includes a TSPEC Element indicating the MAC address of the client device and one or more parameters of the r-TWT SP associated with the P2P communications.

The AP receives the frame carrying the request, and acknowledges reception of the request by transmitting a response frame (RESP) to the STA at time $t_1$. In some implementations, the response frame includes a MAC header that carries the acknowledgement of the request. In some instances, the MAC header of the response frame may include a QoS control field or an A-Control subfield that indicates one or more of the duration of the part of the TXOP to be allocated for the P2P communications, the bandwidth allocated for the P2P communications, the TID of the P2P communications, the SCSID of the P2P communications, the start time for a service period associated with the P2P communications, the service interval associated with the P2P communications, or the delay bound for the service period, the requested type of trigger frame. In some aspects, the response frame may be a QoS Data frame or a Block Acknowledgement (BA) frame.

Between times $t_2$ and $t_3$, the AP senses that the wireless medium is idle for a duration based on a channel sensing operation (such as clear channel assessment (CCA)) before attempting to obtain a TXOP on the wireless medium. In some instances, the AP may sense that the wireless medium is idle for a PIFS duration before attempting to gain channel access (such that the period of time between times $t_2$ and $t_3$ is a PIFS duration). At time $t_3$, the AP senses that the wireless medium is still idle and proceeds to obtain a TXOP, for example, by initiating a transmission over the wireless medium. Specifically, the AP transmits a trigger frame that allocates the requested portion of the TXOP to the STA for the P2P communications. In some aspects, the trigger frame includes a duration field (in the MAC header) that can be used to protect latency-sensitive traffic.

In some implementations, the trigger frame may be an MU-RTS TXS trigger frame that includes a TXOP sharing mode subfield indicating a TXOP sharing mode for the P2P communications between the STA and the client device. The MU-RTS TXS trigger frame may include the MAC address or AID of the STA, and may also include the MAC address of the client device, for example, so that the client device does not set its NAV to the period of time indicated in the duration field of the trigger frame, and instead remains awake to receive management and/or control frames from the softAP (or STA). In some other implementations, other suitable types of trigger frames may be used by the AP to allocate the requested portion of the TXOP for the P2P communications between the softAP (or STA) and the client device.

The STA receives the trigger frame between times $t_3$ and $t_4$, and determines the portion of the TXOP allocated to the STA for P2P communications with the client device. At time $t_4$, the STA acknowledges reception of the MU-RTS TXS trigger frame by transmitting a CTS frame to the AP. In some instances, the CTS frame identifies the softAP and the client device, for example, to prevent the STA and the client device from setting their respective NAVs to the period of time indicated in the duration field of the CTS frame.

Between times $t_5$ and $t_6$, the softAP (or STA) transmits P2P data to the client device using the P2P link 810. In some instances, the P2P link 810 may be established using a Wi-Fi Tunneled Direct Link Setup (TDLS). In other instances, the P2P link 810 may be a W-Fi Direct connection. In some other instances, the STA or the softAP may be a group owner (GO) and coordinate P2P transmissions to or from the client device. The client device receives the P2P data, and acknowledges its reception by transmitting an ACK frame to the softAP (or STA) at time $t_7$.

At time $t_8$, the softAP (or STA) transmits a trigger frame over the P2P link 810 to the client device. The trigger frame, which may be a basic trigger frame, solicits queued P2P data from the client device. The client device receives the trigger frame and, in response thereto, transmits P2P data to the softAP (or STA) using the P2P link 810 between times $t_9$ and $t_{10}$. The softAP (or STA) receives the P2P data, and acknowledges its reception by transmitting an ACK frame to the client device at time $t_{11}$. At time $t_{12}$, the time period Ti corresponding to the allocated portion of the TXOP expires, and the AP may reclaim the remainder of the TXOP.

Figure 9:
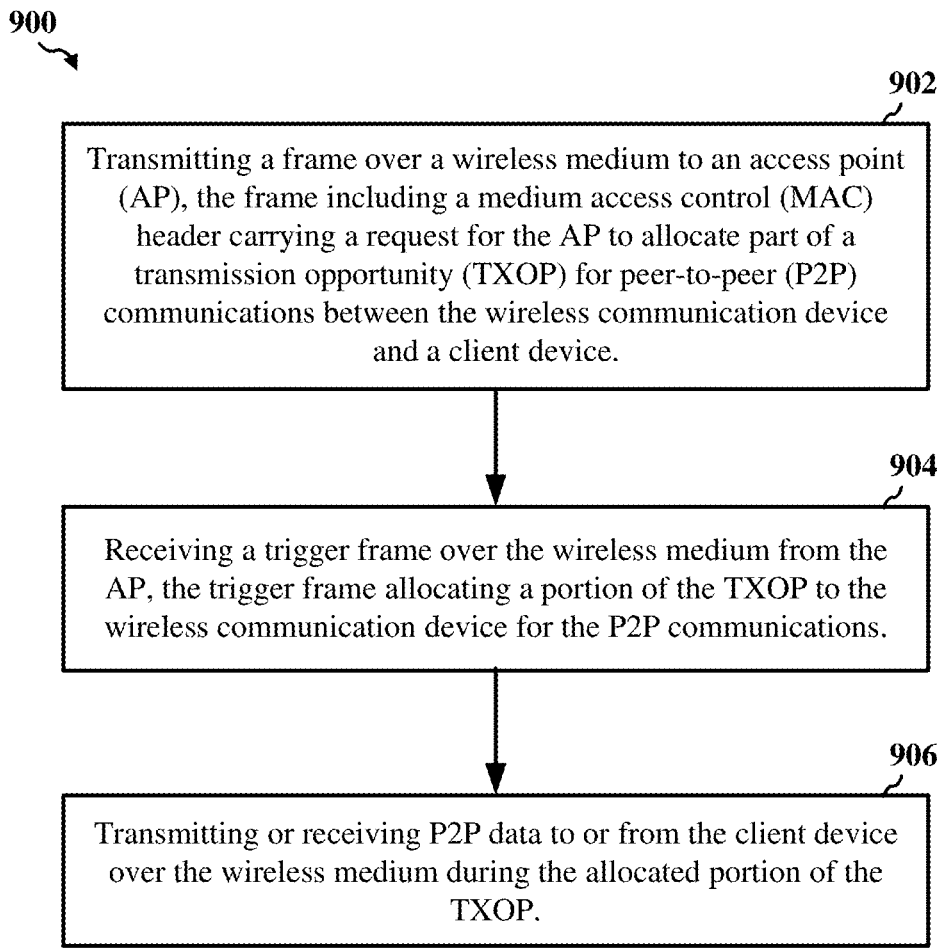
FIG. 9 shows a flowchart illustrating another example process for wireless communication that supports requests to allocate wireless medium resources for latency-sensitive P2P traffic, according to some implementations.

FIG. 9 shows a flowchart illustrating an example process 900 for wireless communication that supports requests to allocate wireless medium resources for latency-sensitive P2P traffic, according to some implementations. The process 900 may be performed by a wireless communication device such as the wireless communication device 500 described above with reference to FIG. 5. In some instances, the process 900 may be performed by a wireless communication device operating as or within a STA, such as one of the STAs 102 and 604 described above with reference to FIGS. 1 and 6B, respectively.

In some implementations, the process 900 begins in block 902 with transmitting a frame over a wireless medium to an access point (AP), the frame including a medium access control (MAC) header carrying a request for the AP to allocate part of a transmission opportunity (TXOP) for peer-to-peer (P2P) communications between the wireless communication device and a client device. In block 904, the process 900 continues with receiving a trigger frame over the wireless medium from the AP, the trigger frame allocating a portion of the TXOP to the wireless communication device for the P2P communications. In block 906, the process 900 continues with transmitting or receiving P2P data to or from the client device over the wireless medium during the allocated portion of the TXOP. In some instances, the request indicates one or more of a duration of the requested part of the TXOP, a requested bandwidth for the P2P communications, a traffic identifier (TID) of the P2P communications, a Stream Classification Service (SCS) identifier (SCSID) of the P2P communications, a requested start time of a service period associated with the P2P communications, a requested service interval for the P2P communications, a delay bound for the service period associated with the P2P communications, or a requested type of trigger frame.

In some implementations, the MAC header of the frame includes a QoS Control field carrying the request. In some instances, the QoS control field includes a reserved bit set to a value indicating that the frame is a P2P request frame, a TID subfield set to a value indicating that the frame is a P2P request frame, the value being greater than or equal to 8, or an ACK Policy Indicator subfield set to a value indicating that the frame is a P2P request frame. In some other instances, the QoS Control field includes an EOSP subfield, an ACK Policy Indicator subfield following the EOSP subfield, a reserved bit following the ACK Policy Indicator subfield, and an octet following the reserved bit. The octet, which may correspond to a TXOP Duration Requested subfield, indicates one or more of a duration of the requested part of the TXOP, a queue size of the wireless communication device, or a TXOP sharing mode bandwidth based on values carried in the EOSP subfield and the reserved bit. For example, setting the EOSP subfield to 0 while setting the reserved bit to 1 may signal that the octet indicates the duration of the requested part of the TXOP and that the ACK Policy Indicator subfield indicates the TXOP sharing mode bandwidth, and setting the EOSP subfield to 1 while setting the reserved bit to 1 may signal that the octet indicates both the TXOP sharing mode bandwidth and the duration of the requested part of the TXOP. For another example, setting the EOSP subfield to 0 while setting the reserved bit to 0 may signal that the octet indicates the duration of the requested part of the TXOP, and setting the EOSP subfield to 1 while setting the reserved bit to 0 may signal that the octet indicates the queue size of the wireless communication device.

In some other implementations, the MAC header of the frame may include an HE variant HT control field containing an A-Control subfield that carries the P2P request. In some instances, the A-Control subfield includes a Control ID subfield set to a reserved value indicating that the frame is a P2P request frame, and includes a Control Information subfield carrying parameters associated with the P2P communications between the wireless communication device and the client device. For example, in some aspects, the reserved value carried in the Control ID subfield may be one of 9, 11, 12, 13, or 14. In some other instances, the parameters associated with the P2P communications may indicate one or more of a duration of the requested part of the TXOP, a requested bandwidth for the P2P communications, a requested start time of a service period associated with the P2P communications, a requested service interval for the P2P communications, a requested type of trigger frame for soliciting the P2P communications, a user priority of a traffic flow associated with the P2P communications, a queue size of the wireless communication device, or a delay bound associated with the service period.

In some instances, the frame may be a TWT request frame that includes a TWT Element indicating the MAC address of the client device and one or more TWT parameters that can be used during one or more service periods associated with the P2P communications between the wireless communication device and the client device. In some other instances, the frame may be an SCS request frame that includes a TSPEC Element indicating the MAC address of the client device and one or more parameters of the service periods associated with the P2P communications.

In various implementations, the trigger frame may be an MU-RTS TXS trigger frame that includes a TXOP sharing mode subfield indicating a TXOP sharing mode for the P2P communications between the wireless communication device and the client device. In some instances, the trigger frame identifies the wireless communication device and the client device.

In some other implementations, the wireless communication device may include a collocated softAP that manages P2P communications between the wireless communication device and the client device. In some instances, the softAP may have a different MAC address than the wireless communication device. For example, the wireless communication device may include separate MAC entities that can independently communicate with the AP and the client device. In some aspects, the wireless communication device may include a first MAC-SAP endpoint responsible for non-AP STA communications with the AP, and may include a second MAC-SAP endpoint responsible for P2P communications between the softAP and the client device.

Figure 10:
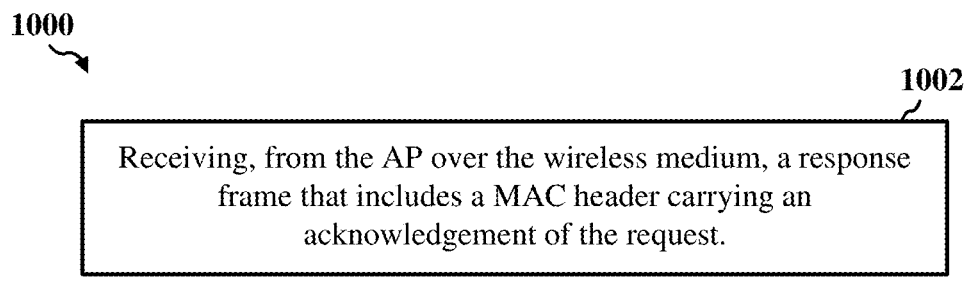
FIG. 10 shows a flowchart illustrating another example process for wireless communication that supports requests to allocate wireless medium resources for latency-sensitive P2P traffic, according to some implementations.

FIG. 10 shows a flowchart illustrating an example process 1000 for wireless communications that supports requests to allocate wireless medium resources for latency-sensitive P2P traffic, according to some other implementations. The process 1000 may be performed by a wireless communication device such as the wireless communication device 500 described above with reference to FIG. 5. In some implementations, the process 1000 may be performed by a wireless communication device operating as or within a STA, such as one of the STAs 104 and 604 described above with reference to FIGS. 1 and 6B, respectively.

In some instances, the process 1000 may be performed after transmitting the frame carrying the request in block 902 of the process 900 of FIG. 9. For example, the process 1000 begins in block 1002 with receiving, from the AP over the wireless medium, a response frame that includes a MAC header carrying an acknowledgement of the request. The response frame may be any suitable frame that can indicate whether the AP has accepted, rejected, or modified one or more P2P parameters requested or indicated by the wireless communication device. In some instances, the response frame may be a TWT response frame including a TWT Element carrying the MAC address of the client device and indicating a set of TWT parameters to be used for the P2P communications during the allocated portion of the TXOP shared by the AP. In some other instances, the response frame may be an SCS response frame including a TSPEC Element carrying the MAC address of the client device and indicating various QoS parameters, data rates, access categories, and user priorities of P2P links associated with the BSS.

In some implementations, the MAC header of the response frame includes a QoS control field or an A-Control subfield indicating one or more of a duration of the requested part of the TXOP, a bandwidth to be allocated for the P2P communications, a TID associated with the P2P communications, an SCSID associated with the P2P communications, a start time for a service period associated with the P2P communications, a service interval associated with the P2P communications, a delay bound for the service period associated with the P2P communications, or a requested type of trigger frame. In some instances, the response frame may be a QoS Data frame. In some other instances, the response frame may be a Block Acknowledgement (BA) frame.

Figure 11:
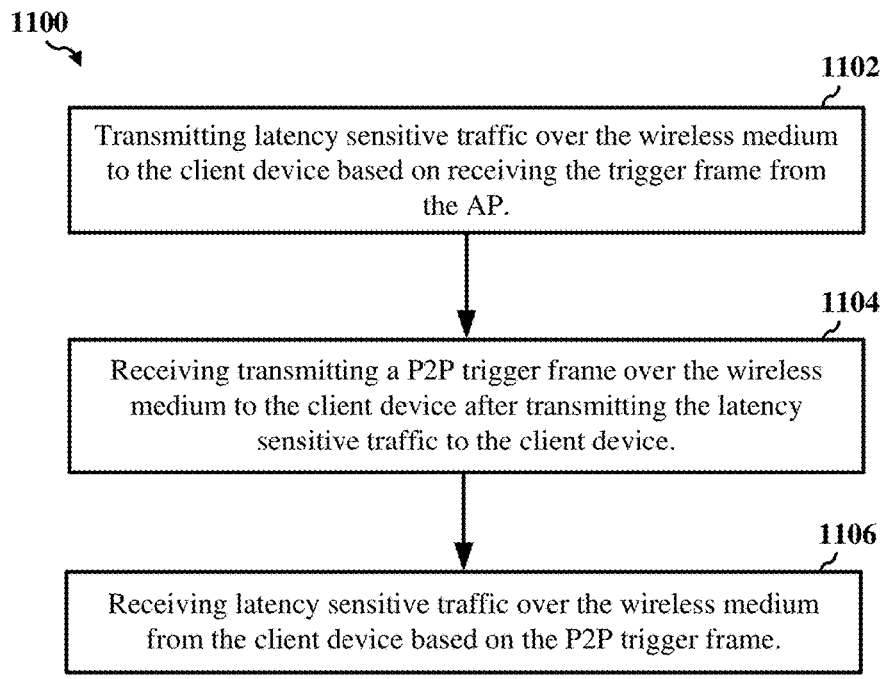
FIG. 11 shows a flowchart illustrating another example process for wireless communication that supports requests to allocate wireless medium resources for latency-sensitive P2P traffic, according to some other implementations.

FIG. 11 shows a flowchart illustrating an example process 1100 for wireless communications that supports requests to allocate wireless medium resources for latency-sensitive P2P traffic, according to some other implementations. The process 1100 may be performed by a wireless communication device such as the wireless communication device 500 described above with reference to FIG. 5. In some implementations, the process 1100 may be performed by a wireless communication device operating as or within a STA, such as one of the STAs 104 and 604 described above with reference to FIGS. 1 and 6B, respectively.

In some instances, the process 1100 may be one implementation of transmitting or receiving the P2P data in block 906 of FIG. 9. For example, at block 1102, the process 1100 begins with transmitting latency-sensitive traffic over the wireless medium to the client device based on receiving the trigger frame from the AP. At block 1104, the process 1100 continues with transmitting a P2P trigger frame over the wireless medium to the client device after transmitting the latency-sensitive traffic to the client device. At block 1106, the process 1100 continues with receiving latency-sensitive traffic over the wireless medium from the client device based on the P2P trigger frame. In some instances, the P2P communications may be received over a tunneled direct-link setup (TDLS) link established between the STA and the client device. In some other instances, the P2P communications may be exchanged between the STA and the client device based on the Wi-Fi Direct peer-to-peer communication protocol.

Figure 12:
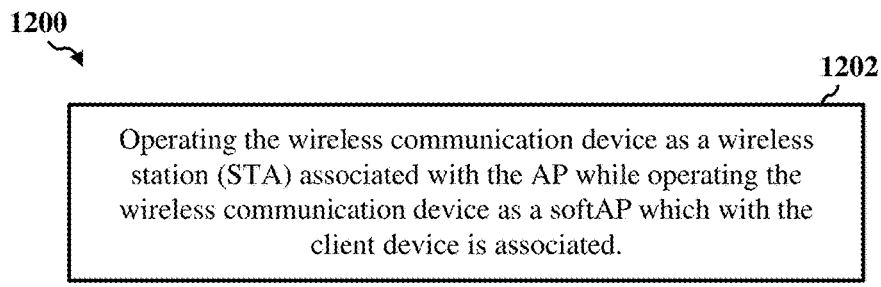
FIG. 12 shows a flowchart illustrating another example process for wireless communication that supports requests to allocate wireless medium resources for latency-sensitive P2P traffic, according to some implementations.

FIG. 12 shows a flowchart illustrating an example process 1200 for wireless communications that supports requests to allocate wireless medium resources for latency-sensitive P2P traffic, according to some other implementations. The process 1200 may be performed by a wireless communication device such as the wireless communication device 500 described above with reference to FIG. 5. In some implementations, the process 1200 may be performed by a wireless communication device operating as or within a STA, such as one of the STAs 104 and 604 described above with reference to FIGS. 1 and 6B, respectively.

In some instances, the process 1200 may be performed in conjunction with the process 900 of FIG. 9. For example, at block 1202, the process 1200 begins with operating the wireless communication device as a wireless station (STA) associated with the AP while operating the wireless communication device as a softAP which with the client device is associated. As discussed, in some instances, the wireless communication device may include two MAC-SAP endpoints S1 and A1. Specifically, the first MAC-SAP endpoint S1 may be responsible for decoding frames and packets received over the wireless medium from the AP, and may be responsible for constructing and formatting frames for transmission over the wireless medium from the wireless communication device to the AP. The second MAC-SAP endpoint A1 may be responsible for decoding frames and packets received over a P2P link from the client device, and may be responsible for constructing and formatting frames for transmission from the softAP to the client device over the P2P link.

Figure 13:
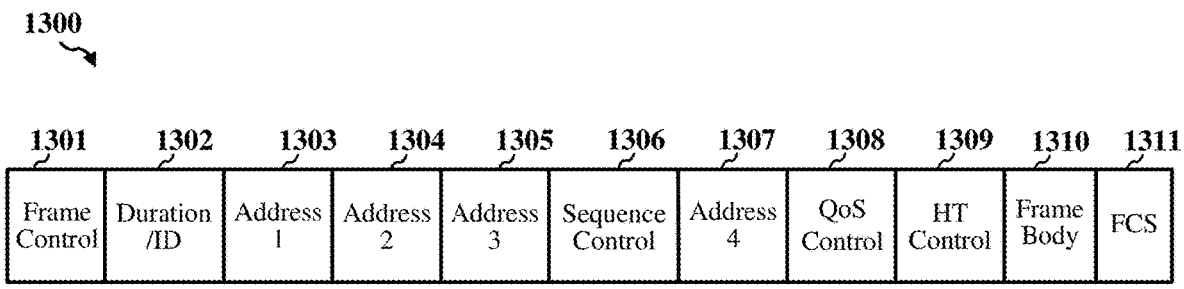
FIG. 13 shows an example structure of a Medium Access Control (MAC) header usable for wireless communications, according to some implementations.

FIG. 13 shows an example structure of a MAC header 1300 usable for wireless communications according to some implementations. The MAC header 1300 may include a Frame Control field 1301, a Duration/ID field 1302, an Address 1 field 1303, an Address 2 field 1304, an Address 3 field 1305, a Sequence Control field 1306, an Address 4 field 1307, a QoS Control field 1308, an HT Control field 1309, a Frame body 1310, and an FCS field 1311. In some other implementations, the MAC header 1300 may include other fields, fewer fields, or more fields.

The Frame Control field 1301 may indicate the form or function of a corresponding frame that includes the MAC header 1300. For example, the Frame Control field 1301 may identify the corresponding frame that includes the MAC header 1300 as a particular type of frame (such as a beacon frame or a P2P Request frame). The Duration/ID field 1302 may indicate the duration of the corresponding frame in milliseconds. The Address 1 field 1303 may indicate a destination address of the corresponding frame. In some instances, the Address 1 field 1303 may contain a broadcast or multicast address, for example, when the corresponding frame is intended for a plurality of wireless communication devices.

The Address 2 field 1304 may indicate a source address of the corresponding frame. For example, the Address 2 field 1304 may include a MAC address of the wireless device that transmitted the corresponding frame. The Address 3 field 1305 may include a BSSID. In some aspects, the BSSID may be the MAC address of the wireless device that transmitted the corresponding frame. The Sequence Control field 1306 includes a sequence number and a fragment number. The sequence number identifies a corresponding MAC frame (such as an MSDU or A-MSDU), and the fragment number indicates the number of each fragment of an MSDU. The Address 4 field 1307 is optional, and may indicate a forwarding address when the corresponding frame is transmitted over a mesh network.

The QoS Control field 1308 may include five or eight subfields (depending on the frame type and the capabilities of the transmitting device), and may carry a value indicating the traffic class or traffic stream to which the corresponding frame belongs. The QoS Control field 1308 may also indicate other QoS information about the corresponding frame including (but not limited to) a buffer size, a queue size, the duration of the requested part of the TXOP, a TXOP limit, and so on.

The HT Control field 1309 may have three variants including the HT variant, the VHT variant, and the HE variant. For example, while the HT and VHT variants include a Control Middle subfields, an AC Constraint subfield, and a More PPDU subfield, the HE variant includes an A-Control subfield. The Frame body 1310 carries data embodied as one or more MSDUs or MDPUs. The FCS field 1311 may include error-detecting codes that enable error detection of data in the corresponding frame.

FIG. 14A shows a table 1400 describing the contents and bit assignments of the QoS Control field 1309 of FIG. 13 for a plurality of different frame types and subtypes. The table 1400 is applicable to the IEEE 802.11ax (and later) amendments to the IEEE 802.11 family of wireless communication standards.

FIG. 14B shows an example QoS Control field 1410 usable for wireless communications that support requests to allocate wireless medium resources for latency-sensitive P2P traffic, according to some implementations. The QoS Control field 1410 is shown to include a TID subfield 1411, an EOSP subfield 1412, an ACK Policy Indicator subfield 1413, a reserved bit 1414, and a TXOP Duration Requested subfield 1415. In some instances, the TID subfield 1411 includes four bits occupying bit positions 0-3 of the QoS Control field 1410, the EOSP subfield 1412 includes one bit occupying bit position 4 of the QoS Control field 1410, the ACK Policy Indicator subfield 1413 includes two bits occupying bit positions 5-6 of the QoS Control field 1410, the reserved bit 1414 includes one bit occupying bit position 7 of the QoS Control field 1410, and the TXOP Duration Requested subfield 1415 includes eight bits (e.g., an octet) occupying bit positions 8-15 of the QoS Control field 1410.

The TID subfield 1411 identifies the traffic class (TC) or traffic stream (TS) to which the corresponding frame belongs. The TID subfield 1411 may also identify the TC or TS of traffic for which a TXOP is being requested, for example, by the values of the TXOP Duration Requested subfield 1415 or the queue size. The EOSP subfield 1412 may indicate the end of the current service period. The ACK Policy Indicator subfield 1413 identifies the ACK policy to use by a receiving device to acknowledge reception of the corresponding frame. The TXOP Duration Requested subfield 1415 indicates the duration, in units of 32 µs, that the sending STA needs for its next TXOP for the specified TID. In some aspects, the TXOP Duration Requested subfield is set to 0 to indicate that no TXOP is requested for the specified TID in the current service period, and is set to a nonzero value to indicate a requested TXOP duration in the range 32 μs to 8160 μs (in increments of 32 μs).

In some implementations, the QoS Control field 1410 may be used to carry a request within the MAC header of a frame transmitted from a STA to an AP. As discussed, the request may be to allocate a portion of a TXOP obtained by the AP for P2P communications between a softAP implemented by or collocated with the STA and a client device associated with the softAP. In some instances, the reserved bit 1414 within the QoS control field 1410 may be set to a value indicating that the frame is a P2P request frame. In other instances, setting the TID subfield 1411 within the QoS control field 1410 to a value greater than or equal to 8 indicates that the frame is a P2P request frame. In some other instances, the ACK Policy Indicator subfield 1413 may be set to a value indicating that the frame is a P2P request frame.

In some implementations, the contents of the TXOP Duration Requested subfield 1415 may be determined by the values carried in the EOSP subfield 1412 and the reserved bit 1414. For example, setting the EOSP subfield 1412 to 0 while setting the reserved bit 1414 to 1 may signal that the TXOP Duration Requested subfield 1415 indicates the duration of the requested part of the TXOP, and may also signal that the ACK Policy Indicator subfield 1413 indicates the TXOP sharing mode bandwidth. Setting the EOSP subfield 1412 to 1 while setting the reserved bit 1414 to 1 may signal that the TXOP Duration Requested subfield 1415 indicates both the TXOP sharing mode bandwidth and the duration of the requested part of the TXOP. For another example, setting the EOSP subfield 1412 to 0 while setting the reserved bit 1414 to 0 may signal that the TXOP Duration Requested subfield 1415 indicates the duration of the requested part of the TXOP, and setting the EOSP subfield 1412 to 1 while setting the reserved bit 1414 to 0 may signal that the TXOP Duration Requested subfield 1415 indicates the queue size of the wireless communication device.

Figure 15:
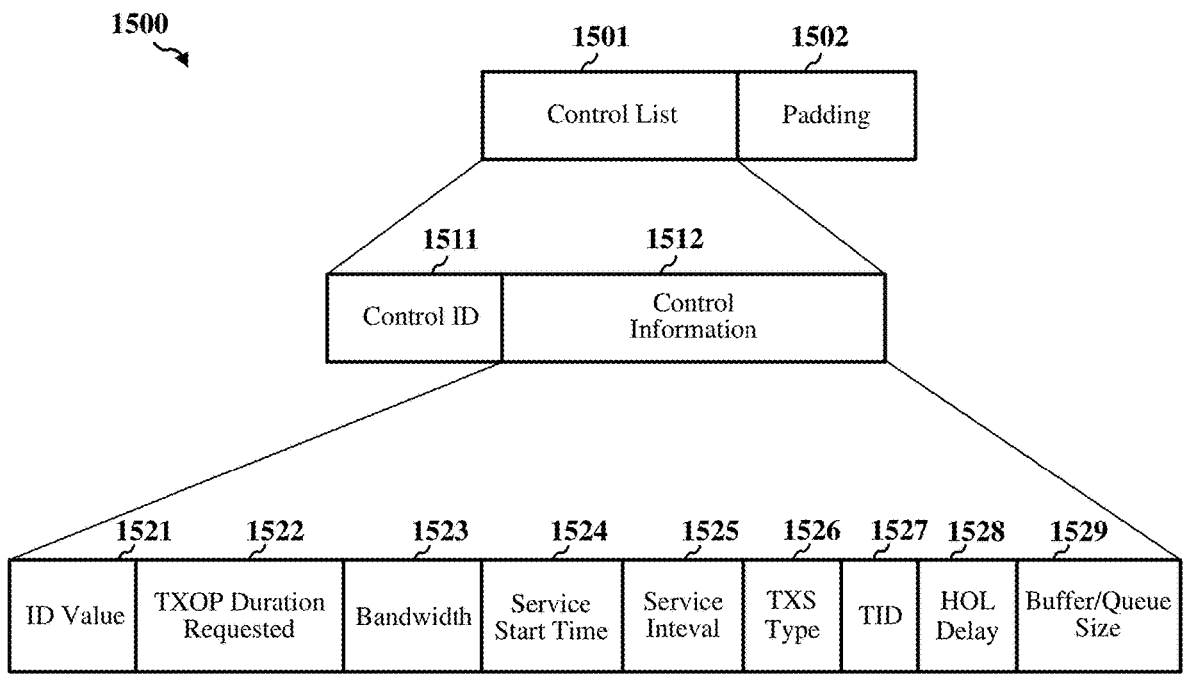
FIG. 15 shows an example structure of an Aggregated-Control (A-Control) subfield usable for wireless communications, according to some implementations.

FIG. 15 shows an example structure of an A-Control subfield 1500 usable for wireless communications, according to some implementations. The A-Control subfield 1500 includes a Control List field 1501 and padding 1502. The padding 1502, if present, follows the last Control subfield and is set to a sequence of zeros so that the length of the A-Control subfield 1500 is 30 bits. The Control List field 1501 includes a Control ID subfield 1511 and a Control Information subfield 1512. The Control ID subfield 1511 indicates the type of information carried in the Control Information subfield 1512. The length of the Control Information subfield 1512 is fixed for each value of the Control ID subfield 1511 that is not reserved.

The Control Information subfield 1512 may include an ID value subfield 1521, a TXOP Duration Requested subfield 1522, a Bandwidth subfield 1523, a Service Start Time subfield 1524, a Service Interval subfield 1525, a TXS Type subfield 1526, a TID subfield 1527, a Head-of-Line (HOL) Delay subfield 1528, and a Buffer/Queue Size subfield 1529. The ID value subfield 1521 may indicate the type or content of information carried in the Control Information subfield 1512. The TXOP Duration Requested subfield 1522 indicates the requested duration of a portion of a TXOP to be allocated or shared with the wireless communication device that transmitted the frame carrying the A-Control subfield 1500. The Bandwidth subfield 1523 indicates the bandwidth or channel width requested for the P2P communications associated with the TXOP sharing mode. The Service Start Time subfield 1524 specifies the time, expressed in microseconds, when the first scheduled service period starts. The Service Interval subfield 1525 specifies the time, expressed in microseconds, between scheduled service periods. The TXS Type subfield 1526 indicates the type of the requested trigger frame. The TID subfield 1527 indicates the traffic class or traffic stream to which the corresponding frame belongs. The HOL Delay subfield 1528 indicates the delay bound for the head of line packets after which the packets may be dropped. In some instances, the delay bound may be determined based on the TSF value of the AP. In some other instances, the delay bound may be determined based on the packet transmission time. The Buffer/Queue Size subfield 1529 indicates the size of buffer in bytes that has the HOL delay (delay bound) for a corresponding TID.

Figure 16:
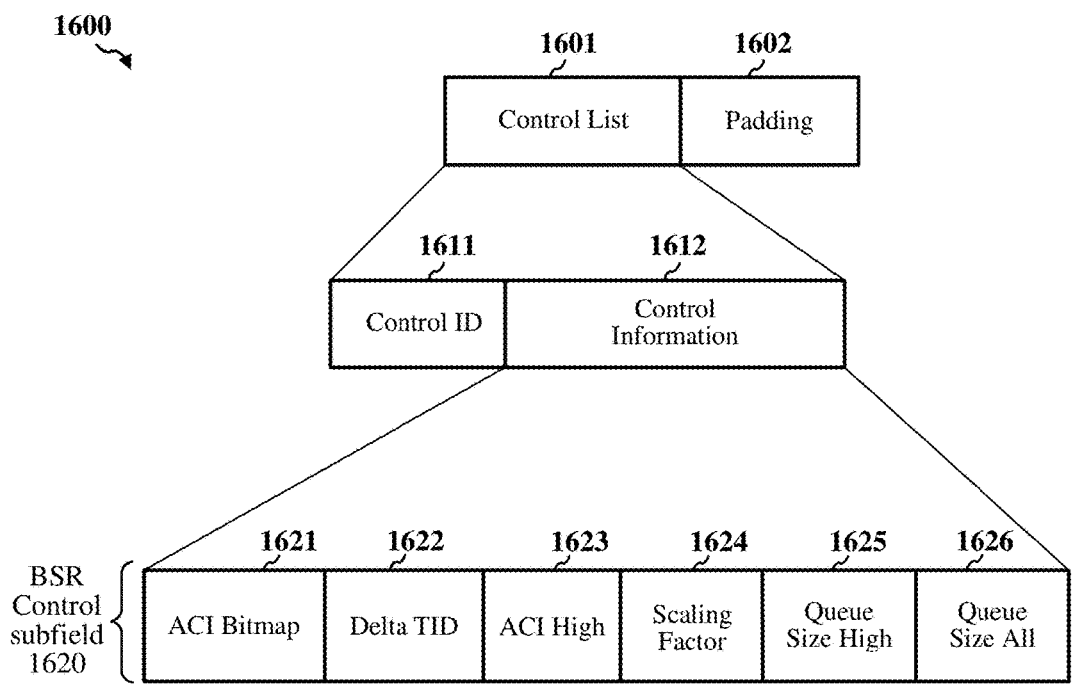
FIG. 16 shows another example structure of an A-Control subfield usable for wireless communications, according to some implementations.

FIG. 16 shows an example structure of an A-Control subfield 1600 usable for wireless communications, according to some other implementations. The A-Control subfield 1600 includes a Control List field 1601 and padding 1602. The padding 1602, if present, follows the last Control subfield and is set to a sequence of zeros so that the length of the A-Control subfield 1600 is 30 bits. The Control List field 1601 includes a Control ID subfield 1611 and a Control Information subfield 1612. The Control ID subfield 1611 indicates the type of information carried in the Control Information subfield 1612. The length of the Control Information subfield 1612 is fixed for each value of the Control ID subfield 1611 that is not reserved.

The Control Information subfield 1612 may include a Buffer Status Report (BSR) Control subfield 1620 that includes an Access Category Indicator (ACI) Bitmap subfield 1621, a Delta TID subfield 1622, an ACI High subfield 1623, a Scaling Factor subfield 1624, a Queue Size High subfield 1625, and a Queue Size All subfield 1626. The ACI Bitmap subfield 1621 indicates the access categories for which the buffer status is reported. The Delta TID subfield 1622, together with the values of the ACI Bitmap subfield 1621, indicates the number of TIDs for which the STA is reporting the buffer status. The ACI High subfield 1623 indicates the ACI of the access category for which the buffer status report is indicated in the Queue Size High subfield 1625. The Scaling Factor subfield 1624 indicates the unit SF, in octets, of the Queue Size High subfield 1625 and the Queue Size All subfield 1626. The Queue Size High subfield 1625 indicates the amount of buffered traffic for the access category identified by the ACI High subfield 1625 intended for the STA identified by the receiver address of the frame containing the BSR Control subfield 1620. The Queue Size All subfield 1626 indicates the amount of buffered traffic for all the access categories identified by the ACI Bitmap subfield 1621 intended for the STA identified by the receiver address of the frame containing the BSR Control subfield 1620.

In some implementations, the BSR Control subfield 1620 may be used to indicate that the corresponding frame contains a request for an AP to allocate a portion of a TXOP for P2P communications between the transmitting device and a client device associated with the transmitting device. In some instances, the Delta TID subfield 1622 is set to a reserved value indicating that the corresponding frame is a P2P request frame, and the Queue Size High subfield 1625 and the Queue Size All subfield 1626 carry values that collectively indicate a duration of the requested part of the TXOP and a requested TXOP sharing mode bandwidth.

Figure 17A:
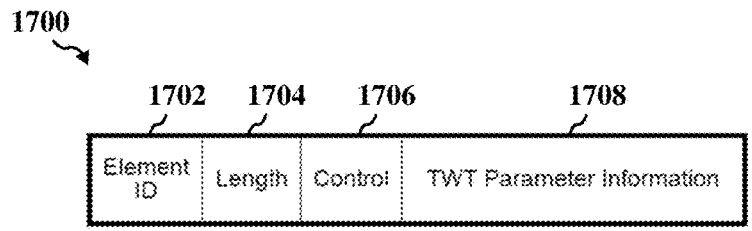
FIG. 17A shows an example structure of a Target Wake Time (TWT) Element usable for wireless communications, according to some implementations.

FIG. 17A shows an example structure of a TWT Element 1700 usable for wireless communications, according to some implementations. The TWT Element 1700 may include an element ID field 1702, a length field 1704, a control field 1706, and a TWT parameter information field 1708. The element ID field 1702 indicates that the element is a TWT Element. The length field 1704 indicates a length of the TWT Element 1700. The control field 1706 includes various control information for a restricted TWT session advertised by the TWT Element 1700. The TWT parameter information field 1708 contains either a single individual TWT Parameter Set field or one or more Broadcast TWT Parameter Set fields.

Figure 17B:
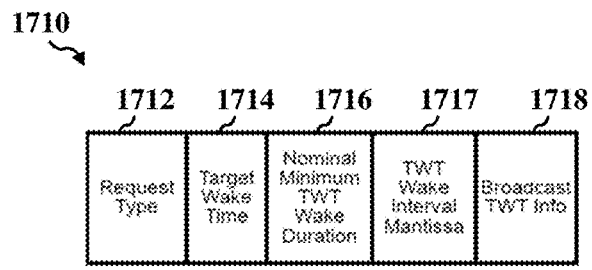
FIG. 17B shows an example structure of a broadcast TWT Parameter Set field usable for wireless communications, according to some implementations.

FIG. 17B shows an example structure of a broadcast TWT Parameter Set field 1710 usable for wireless communications, according to some implementations. In some instances, the broadcast TWT Parameter Set field 1710 may be included within the TWT Parameter Information field 1708 of FIG. 17A. The broadcast TWT Parameter Set field 1710 may include a Request Type field 1712, a Target Wake Time field 1714, a Nominal Minimum TWT Wake Duration field 1716, a TWT Wake Interval Mantissa field 1717, and a Broadcast TWT Info field 1718. The Request Type field 1712 indicates a type of TWT session requested. The Target Wake Time field 1714 carries an unsigned integer corresponding to a TSF time at which the STA requests to wake. The Nominal Minimum TWT Wake Duration field 1716 indicates the minimum amount of time that the TWT requesting STA or TWT scheduled STA is expected remain in an awake state or mode. The TWT Wake Interval Mantissa field 1717 may be set to a non-zero value a periodic TWT and a zero value for an aperiodic TWT. The Broadcast TWT Info field 1718 may include a broadcast TWT ID for a corresponding restricted TWT session, and carry information indicating the number of TBTTs during which the Broadcast TWT SPs corresponding to the broadcast TWT Parameter set are present.

Figure 17C:
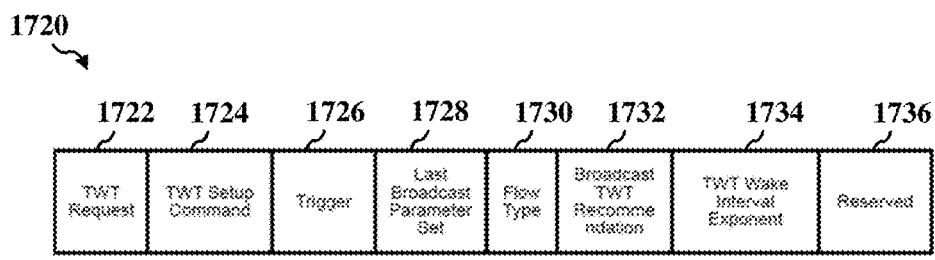
FIG. 17C shows an example structure of a Request Type field in a Broadcast TWT Parameter Set field usable for wireless communications, according to some implementations.

FIG. 17C shows an example structure of a Request Type field 1720 of a Broadcast TWT Parameter Set field usable for wireless communications, according to some implementations. In some instances, the Request Type field 1720 may be one example of the Request Type field 1712 of FIG. 17B. The Request Type field 1720 may include a TWT Request subfield 1722, a TWT setup command subfield 1724, a trigger subfield 1726, a Last Broadcast Parameter Set subfield 1728, a Flow Type subfield 1730, a Broadcast TWT Recommendation subfield 1732, a TWT Wake Interval Exponent subfield 1734, and a number of reserved bits 1736. The TWT Request subfield 1722 may carry a value indicating whether the corresponding TWT Information Element was transmitted by a scheduled STA or by a scheduling STA. The TWT Setup Command subfield 1724 may carry values that indicate the type of TWT commands carried in the TWT Information Element. The Trigger subfield 1726 may indicate whether or not the TWT SP indicated by the TWT Element 1700 includes trigger frames or frames carrying a TRS Control subfield.

The Last Broadcast Parameter Set subfield 1728 indicates whether another broadcast TWT Parameter Set follows. For example, the Last Broadcast Parameter Set subfield 1728 may be set to a value of 0 to indicate that there is another TWT Parameter set following this set, or may be set to a value of 1 to indicate that this is the last broadcast TWT Parameter set in the broadcast TWT element. The Flow Type subfield 1730 indicates the type of interaction between the TWT requesting STA or TWT scheduled STA and the TWT responding STA or TWT scheduling AP at a TWT. For example, setting the Flow Type subfield 1730 to a value of 0 indicates an announced TWT in which the TWT requesting STA or the TWT scheduled STA sends a PS-Poll or an APSD trigger frame to signal its awake state. Setting the Flow Type subfield 1730 to a value of 1 indicates an unannounced TWT in which the TWT responding STA or TWT scheduling AP will send a frame to the TWT requesting STA or TWT scheduled STA at TWT without waiting to receive a PS-Poll or an APSD trigger frame.

The Broadcast TWT Recommendation subfield 1732 contains a value that indicates recommendations on the types of frames that are transmitted by TWT scheduled STAs and scheduling AP during the broadcast TWT SP, encoded according to the Broadcast TWT Recommendation subfield 1732 for a broadcast TWT element. In some instances, the Broadcast TWT Recommendation subfield 1732 may indicate whether the restricted TWT session is a peer-to-peer TWT session or a broadcast TWT session. The TWT Wake Interval Exponent subfield 1734 carries a value from which the TWT wake interval can be obtained. In some instances, the TWT Wake Interval Exponent subfield 1734 is set to the value of the exponent of the TWT Wake Interval value in microseconds, base 2.

Figure 18:
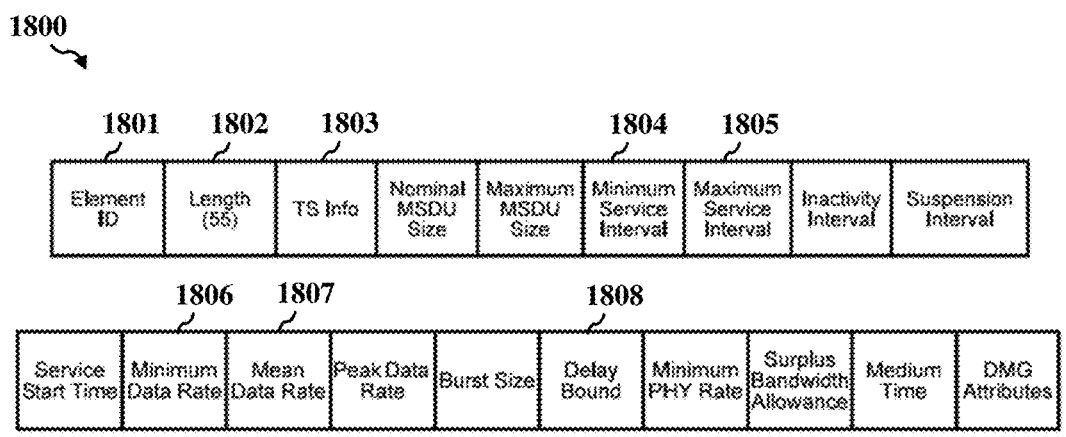
FIG. 18 shows an example structure of a Traffic Specification (TSPEC) field usable for wireless communications, according to some implementations.

FIG. 18 shows an example structure of a Traffic Specification (TSPEC) Element 1800 usable for wireless communications, according to some implementations. Among other fields, the TSPEC Element 1800 may include an element ID field 1801, a length field 1802, a traffic stream (TS) info field 1803, a minimum service interval field 1804, a maximum service interval field 1805, a minimum data rate field 1806, a mean data rate field 1807, and a delay bound field 1808. In some implementations, all fields other than the element ID field 1801, the length field 1802, the TS info field 1803, the minimum service interval field 1804, the maximum service interval field 1805, the minimum data rate field 1806, the mean data rate field 1807, and the delay bound field 1808 may be omitted.

The element ID field 1801 may indicate that the element 1800 is a TSPEC Element. In some instances, the element ID field 1801 may indicate that the element 1800 is a reduced TSPEC Element that includes only the element ID field 1801, the length field 1802, the TS info field 1803, the minimum service interval field 1804, the maximum service interval field 1805, the minimum data rate field 1806, the mean data rate field 1807, and the delay bound field 1808. The length field 1802 may indicate a length of the TSPEC Element 1800. The TS info field 1803 may include the user priority (UP) for a corresponding service period. The minimum service interval field 1804 may indicate the smallest allowed service interval between corresponding service periods. The maximum service interval field 1805 may indicate the largest allowed service interval between corresponding service periods. The minimum data rate field 1806 may include the minimum data rate for the corresponding service period. The mean data rate field 1807 may include the mean data rate for the corresponding service period. The delay bound field 1808 may include the delay bound for the corresponding service period.

In some implementations, the TSPEC Element 1800 may be used to indicate that the corresponding frame contains a request for an AP to allocate a portion of a TXOP for P2P communications between the transmitting device and a client device associated with the transmitting device.

Figure 19:
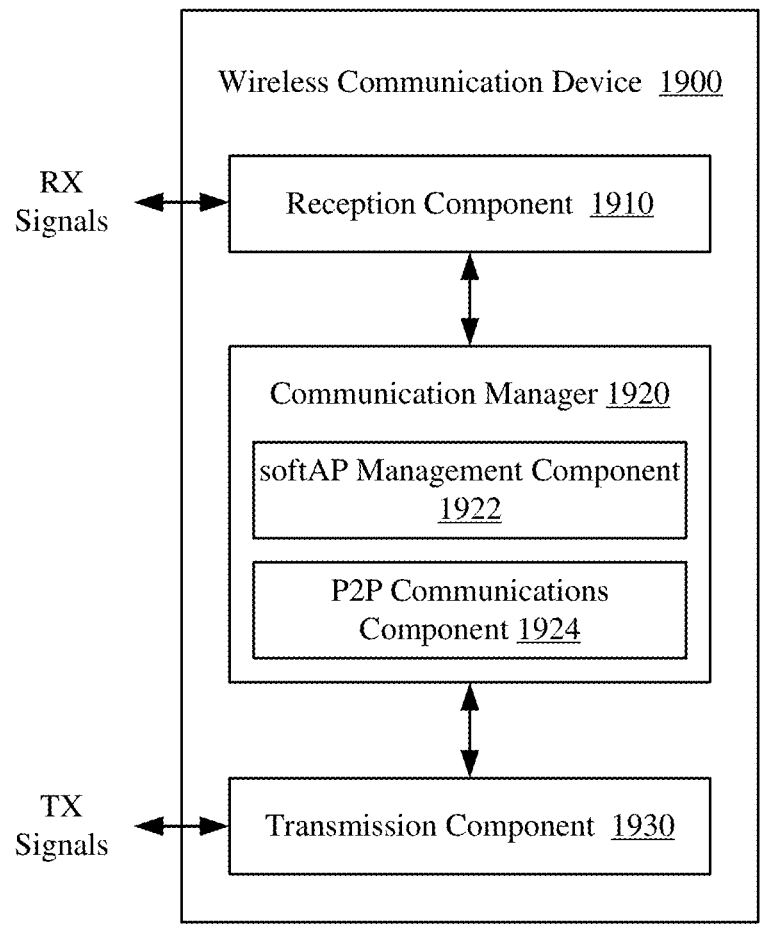
FIG. 19 shows a block diagram of an example wireless communication device, according to some implementations.

FIG. 19 shows a block diagram of an example wireless communication device 1900. In some implementations, the wireless communication device 1900 may be configured to perform one or more of the processes 900, 1000, 1100, or 1200 described above with reference to FIGS. 9, 10, 11, and 12, respectively. The wireless communication device 1900 can be an example implementation of any of the STAs 104 of FIG. 1, the wireless communication device 500 of FIG. 5, or the STA 604 of FIG. 6B. More specifically, the wireless communication device 1900 can be a chip, SoC, chipset, package or device that includes at least one processor and at least one modem (for example, a Wi-Fi (IEEE 802.11) modem or a cellular modem).

The wireless communication device 1900 includes a reception component 1910, a communication manager 1920, and a transmission component 1930. The communication manager 1920 further includes a softAP management component 1922 and a P2P communications component 1924. Portions of one or more of the components 1922 or 1924 may be implemented at least in part in hardware or firmware. In some implementations, one or more of the components 1922 or 1924 are implemented at least in part as software stored in a memory (such as the memory 508 of FIG. 5). For example, portions of one or more of the components 1922 or 1924 can be implemented as non-transitory instructions (or "code") executable by a processor (such as the processor 506 of FIG. 5) to perform the functions or operations of the respective component.

The reception component 1910 is configured to receive RX signals from one or more other wireless communication devices, and the transmission component 1930 is configured to transmit TX signals to one or more other wireless communication devices. The communication manager 1920 is configured to manage wireless communications with one or more other wireless communication devices. In some implementations, the softAP management component 1922 may implement or manage a softAP collocated or otherwise associated with the wireless communication device 1900. The P2P communications component 1924 may request an AP to allocate a portion of a TXOP obtained on the wireless medium for P2P communications between the wireless communication device 1900 and a client device associated with the wireless communication device 1900. The P2P communications component 1924 may also transmit a trigger frame to the client device to solicit P2P transmissions from the client device.

Implementation examples are described in the following numbered clauses:

1. A method for wireless communication by a wireless communication device, including:
   transmitting a frame over a wireless medium to an access point (AP), the frame including a medium access control (MAC) header carrying a request for the AP to allocate a portion of a transmission opportunity (TXOP) obtained on the wireless medium for peer-to-peer (P2P) communications between the wireless communication device and a client device;
   receiving a trigger frame over the wireless medium from the AP, the trigger frame allocating the portion of the TXOP to the wireless communication device for the P2P communications; and
   transmitting or receiving P2P data to or from the client device over the wireless medium during the allocated portion of the TXOP.

2. The method of clause 1, where the request indicates one or more of a duration of the requested part of the TXOP, a requested bandwidth for the P2P communications, a traffic identifier (TID) of the P2P communications, a Stream Classification Service (SCS) identifier (SCSID) of the P2P communications, a requested start time of a service period associated with the P2P communications, a requested service interval for the P2P communications, a delay bound for the service period associated with the P2P communications, or a requested type of trigger frame.

3. The method of any one or more of clauses 1-2, where the MAC header of the frame includes a Quality-of-Service (QoS) control field carrying the request.

4. The method of clause 3, where the QoS control field includes:
   a reserved bit set to a value indicating that the frame is a P2P request frame;
   a Traffic Identifier (TID) subfield set to a value indicating that the frame is a P2P request frame, the value being greater than or equal to 8; or
   an Acknowledgement (ACK) Policy Indicator subfield set to a value indicating that the frame is a P2P request frame.

5. The method of any one or more of clauses 3-4, where the QoS control field includes an End Of Service Period (EOSP) subfield, an Acknowledgement (ACK) Policy Indicator subfield following the EOSP subfield, a reserved bit following the ACK Policy Indicator subfield, and an octet following the reserved bit, where the octet indicates one or more of a duration of the requested part of the TXOP, a queue size of the wireless communication device, or a TXOP sharing mode bandwidth based on values carried in the EOSP subfield and the reserved bit.

6. The method of clause 5, where:
   the EOSP subfield carrying a value of 0 when the reserved bit is set to 1 signals that the octet indicates the duration of the requested part of the TXOP and signals that the ACK Policy Indicator subfield indicates the TXOP sharing mode bandwidth; and
   the EOSP subfield carrying a value of 1 when the reserved bit is set to 1 signals that the octet indicates both the TXOP sharing mode bandwidth and the duration of the requested part of the TXOP.

7. The method of clause 6, where the EOSP subfield set to a value of 0 when the reserved bit is set to 0 signals that the octet indicates the duration of the requested part of the TXOP, and where the EOSP subfield set to 1 when the reserved bit is set to 0 signals that the octet indicates the queue size of the wireless communication device.

8. The method of clause 1, where the MAC header of the frame includes an aggregated-control (A-Control) subfield carrying the request.

9. The method of clause 8, where the A-Control subfield includes:
   a Control Identification (ID) subfield carrying a reserved value indicating that the frame is a P2P request frame; and
   a Control Information subfield carrying one or more parameters for the P2P communications associated with the request for the allocated portion of the TXOP.

10. The method of clause 9, where the reserved value carried in the Control ID subfield is one of 9, 11, 12, 13, or 14.

11. The method of any one or more of clauses 9-10, where the one or more parameters for the P2P communications include one or more of a duration of the requested part of the TXOP, a requested bandwidth for the P2P communications, a requested start time of a service period associated with the P2P communications, a requested service interval for the P2P communications, a requested type of trigger frame for soliciting the P2P communications, a traffic identifier (TID) of the P2P communications, a Stream Classification Service (SCS) identifier (SCSID) of the P2P communications, a user priority of a traffic flow associated with the P2P communications, a queue size of the wireless communication device, or a delay bound for the service period associated with the P2P communications.

12. The method of any one or more of clauses 8-11, where the A-Control subfield carries a Control Information subfield including:
  a Delta Traffic Identifier (TID) subfield carrying a reserved value indicating that the frame is a P2P request frame; and
  a Queue Size High subfield and a Queue Size All subfield carrying values that collectively indicate a duration of the requested part of the TXOP and a requested TXOP sharing mode bandwidth.

13. The method of any one or more of clauses 1-12, where the frame is a target wake time (TWT) request frame that includes a TWT Element indicating the MAC address of the client device and one or more TWT parameters of a restricted TWT (r-TWT) service period (SP) associated with the P2P communications.

14. The method of any one or more of clauses 1-12, where the frame is a Stream Classification Service (SCS) request frame that includes a Traffic Specification (TSPEC) Element indicating the MAC address of the client device and one or more data rate parameters of a restricted Target Wake Time (r-TWT) service period (SP) associated with the P2P communications.

15. The method of any one or more of clauses 1-14, where the trigger frame identifies the wireless communication device and the client device.

16. The method of any one or more of clauses 1-15, where the trigger frame includes a multi-user (MU) Request-to-Send (RTS) TXOP Sharing (TXS) trigger frame that includes a TXOP sharing mode subfield indicating a TXOP sharing mode for the P2P communications between the wireless communication device and the client device.

17. The method of any one or more of clauses 1-16, further including:
  receiving, from the AP over the wireless medium, a response frame that includes a MAC header carrying an acknowledgement of the request.

18. The method of clause 17, where the MAC header of the response frame includes a QoS control field or an Aggregated-Control (A-Control) subfield indicating one or more of a duration of the requested part of the TXOP, a bandwidth to be allocated for the P2P communications, a traffic identifier (TID) of the P2P communications, a Stream Classification Service (SCS) identifier (SCSID) of the P2P communications, a start time for a service period associated with the P2P communications, a service interval associated with the P2P communications, a delay bound for the service period associated with the P2P communications, or a requested type of trigger frame.

19. The method of clause 18, where the response frame includes a Quality-of-Service (QoS) Data frame or a Block Acknowledgement (BA) frame.

20. The method of any one or more of clauses 1-19, where transmitting or receiving the P2P data includes:
  transmitting latency-sensitive traffic over the wireless medium to the client device based on receiving the trigger frame from the AP;
  transmitting a P2P trigger frame over the wireless medium to the client device after transmitting the latency-sensitive traffic to the client device; and
  receiving latency-sensitive traffic over the wireless medium from the client device based on the P2P trigger frame.

21. The method of any one or more of clauses 1-20, where the client device includes a virtual-reality (VR) or Augmented Reality (AR) headset associated with the wireless communication device and not associated with the AP.

22. The method of any one or more of clauses 1-21, further including:
  operating the wireless communication device as a wireless station (STA) associated with the AP while operating the wireless communication device as a softAP which with the client device is associated.

23. A wireless communication device including:
  at least one modem;
  at least one processor communicatively coupled with the at least one modem; and
  at least one memory communicatively coupled with the at least one processor and storing processor-readable code that, when executed by the at least one processor in conjunction with the at least one modem, is configured to:
    transmit a frame over a wireless medium to an access point (AP), the frame including a medium access control (MAC) header carrying a request for the AP to allocate a portion of a transmission opportunity (TXOP) obtained on the wireless medium for peer-to-peer (P2P) communications between the wireless communication device and a client device;
    receive a trigger frame over the wireless medium from the AP, the trigger frame allocating the portion of the TXOP to the wireless communication device for the P2P communications; and
    transmit or receive P2P data to or from the client device over the wireless medium during the allocated portion of the TXOP.

24. The wireless communication device of clause 23, where the request indicates one or more of a duration of the requested part of the TXOP, a requested bandwidth for the P2P communications, a traffic identifier (TID) of the P2P communications, a Stream Classification Service (SCS) identifier (SCSID) of the P2P communications, a requested start time of a service period associated with the P2P communications, a requested service interval for the P2P communications, a delay bound for the service period associated with the P2P communications, or a requested type of trigger frame.

25. The wireless communication device of any one or more of clauses 23-24, where the MAC header of the frame includes a Quality-of-Service (QoS) control field carrying the request.

26. The wireless communication device of clause 25, where the QoS control field includes an End Of Service Period (EOSP) subfield, an Acknowledgement (ACK) Policy Indicator subfield following the EOSP subfield, a reserved bit following the ACK Policy Indicator subfield, and an octet following the reserved bit, where the octet indicates one or more of a duration of the requested part of the TXOP, a queue size of the wireless communication device, or a TXOP sharing mode bandwidth based on values carried in the EOSP subfield and the reserved bit.

27. The wireless communication device of clause 23, where the MAC header of the frame includes an aggregated-control (A-Control) subfield carrying the request.

28. The wireless communication device of clause 27, where the A-Control subfield includes:
  a Control Identification (ID) subfield carrying a reserved value indicating that the frame is a P2P request frame; and
  a Control Information subfield carrying one or more parameters for the P2P communications associated with the request for the allocated portion of the TXOP.

29. The wireless communication device of any one or more of clauses 23-28, where execution of the processor-readable code is further configured to:

receive, from the AP over the wireless medium, a response frame that includes a MAC header carrying an acknowledgement of the request.

30. The wireless communication device of clause 29, where the MAC header of the response frame includes a QoS control field or an Aggregated-Control (A-Control) subfield indicating one or more of a duration of the requested part of the TXOP, a bandwidth to be allocated for the P2P communications, a traffic identifier (TID) of the P2P communications, a Stream Classification Service (SCS) identifier (SCSID) of the P2P communications, a start time for a service period associated with the P2P communications, a service interval associated with the P2P communications, a delay bound for the service period associated with the P2P communications, or a requested type of trigger frame.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:

transmitting a frame over a wireless medium to an access point (AP), the frame including a medium access control (MAC) header and carrying a request for the AP to allocate part of a contention-based transmission opportunity (TXOP) obtained by the AP for peer-to-peer (P2P) communications between the wireless communication device and a client device;

receiving, from the AP over the wireless medium, a response frame that includes a MAC header carrying an acknowledgement of the request for the AP to allocate part of the contention-based TXOP obtained by the AP for P2P communications;

receiving, based at least in part on receiving the response frame, a trigger frame over the wireless medium from the AP, the trigger frame allocating a portion of the contention-based TXOP to the wireless communication device for the P2P communications; and transmitting or receiving P2P data to or from the client device over the wireless medium during the allocated portion of the contention-based TXOP.

2. The method of claim 1, wherein the request indicates one or more of a duration of the requested part of the TXOP, a requested bandwidth for the P2P communications, a traffic identifier (TID) of the P2P communications, a Stream Classification Service (SCS) identifier (SCSID) of the P2P communications, a requested start time of a service period associated with the P2P communications, a requested service interval for the P2P communications, a delay bound for the service period associated with the P2P communications, or a requested type of trigger frame.

3. The method of claim 1, wherein the MAC header of the frame includes a Quality-of-Service (QoS) control field carrying the request.

4. The method of claim 3, wherein the QoS control field includes:

a reserved bit set to a value indicating that the frame is a P2P request frame;

a Traffic Identifier (TID) subfield set to a value indicating that the frame is the P2P request frame, the value being greater than or equal to 8; or an Acknowledgement (ACK) Policy Indicator subfield set to a value indicating that the frame is the P2P request frame.

5. The method of claim 3, wherein the QoS control field includes an End Of Service Period (EOSP) subfield, an Acknowledgement (ACK) Policy Indicator subfield following the EOSP subfield, a reserved bit following the ACK Policy Indicator subfield, and an octet following the reserved bit, wherein the octet indicates one or more of a duration of the requested part of the TXOP, a queue size of the wireless communication device, or a TXOP sharing mode bandwidth based on values carried in the EOSP subfield and the reserved bit.

6. The method of claim 5, wherein:
the EOSP subfield carrying a value of 0 when the reserved bit is set to 1 signals that the octet indicates the duration of the requested part of the TXOP and signals that the ACK Policy Indicator subfield indicates the TXOP sharing mode bandwidth; and
the EOSP subfield carrying a value of 1 when the reserved bit is set to 1 signals that the octet indicates both the TXOP sharing mode bandwidth and the duration of the requested part of the TXOP.

7. The method of claim 6, wherein the EOSP subfield set to a value of 0 when the reserved bit is set to 0 signals that the octet indicates the duration of the requested part of the TXOP, and wherein the EOSP subfield set to 1 when the reserved bit is set to 0 signals that the octet indicates the queue size of the wireless communication device.

8. The method of claim 1, wherein the MAC header of the frame includes an aggregated-control (A-Control) subfield carrying the request.

9. The method of claim 8, wherein the A-Control subfield includes:
a Control Identification (ID) subfield carrying a reserved value indicating that the frame is a P2P request frame; and
a Control Information subfield carrying one or more parameters for the P2P communications associated with the request for the allocated portion of the TXOP.

10. The method of claim 9, wherein the reserved value carried in the Control ID subfield is one of 9, 11, 12, 13, or 14.

11. The method of claim 9, wherein the one or more parameters for the P2P communications include one or more of a duration of the requested part of the TXOP, a requested bandwidth for the P2P communications, a requested start time of a service period associated with the P2P communications, a requested service interval for the P2P communications, a requested type of trigger frame for soliciting the P2P communications, a traffic identifier (TID) of the P2P communications, a Stream Classification Service (SC S) identifier (SCSID) of the P2P communications, a user priority of a traffic flow associated with the P2P communications, a queue size of the wireless communication device, or a delay bound for the service period associated with the P2P communications.

12. The method of claim 8, wherein the A-Control subfield carries a Control Information subfield including:
a Traffic Identifier (TID) subfield carrying a reserved value indicating that the frame is a P2P request frame; and
a Queue Size High subfield and a Queue Size All subfield carrying values that collectively indicate a duration of the requested part of the TXOP and a requested TXOP sharing mode bandwidth.

13. The method of claim 1, wherein the frame is a target wake time (TWT) request frame that includes a TWT Element indicating a MAC address of the client device and one or more TWT parameters of a restricted TWT (r-TWT) service period (SP) associated with the P2P communications.

14. The method of claim 1, wherein the frame is a Stream Classification Service (SC S) request frame that includes a Traffic Specification (TSPEC) Element indicating a MAC address of the client device and one or more data rate parameters of a restricted Target Wake Time (r-TWT) service period (SP) associated with the P2P communications.

15. The method of claim 1, wherein the trigger frame identifies the wireless communication device and the client device.

16. The method of claim 1, wherein the trigger frame comprises a multi-user (MU) Request-to-Send (RTS) TXOP Sharing (TXS) trigger frame that includes a TXOP sharing mode subfield indicating a TXOP sharing mode for the P2P communications between the wireless communication device and the client device.

17. The method of claim 1, wherein the MAC header of the response frame includes a QoS control field or an Aggregated-Control (A-Control) subfield indicating one or more of a duration of the requested part of the TXOP, a bandwidth to be allocated for the P2P communications, a traffic identifier (TID) of the P2P communications, a Stream Classification Service (SCS) identifier (SCSID) of the P2P communications, a start time for a service period associated with the P2P communications, a service interval associated with the P2P communications, a delay bound for the service period associated with the P2P communications, or a requested type of trigger frame.

18. The method of claim 17, wherein the response frame comprises a Quality-of-Service (QoS) Data frame or a Block Acknowledgement (BA) frame.

19. The method of claim 1, wherein transmitting or receiving the P2P data includes:
transmitting latency-sensitive traffic over the wireless medium to the client device based on receiving the trigger frame from the AP;
transmitting a P2P trigger frame over the wireless medium to the client device after transmitting the latency-sensitive traffic to the client device; and
receiving latency-sensitive traffic over the wireless medium from the client device based on the P2P trigger frame.

20. The method of claim 1, wherein the client device comprises a virtual-reality (VR) or Augmented Reality (AR) headset associated with the wireless communication device and not associated with the AP.

21. The method of claim 1, further comprising:
operating the wireless communication device as a wireless station (STA) associated with the AP while operating the wireless communication device as a softAP with which the client device is associated.

22. A wireless communication device comprising:
at least one processor; and
at least one memory communicatively coupled with the at least one processor and storing processor-readable code that, when executed by the at least one processor, is configured to:
transmit a frame over a wireless medium to an access point (AP), the frame including a medium access control (MAC) header and carrying a request for the AP to allocate part of a contention-based transmission opportunity (TXOP) obtained by the AP for peer-to-peer (P2P) communications between the wireless communication device and a client device;
receive, from the AP over the wireless medium, a response frame that includes a MAC header carrying an acknowledgement of the request for the AP to allocate part of the contention-based TXOP obtained by the AP for P2P communications;
receive, based at least in part on receiving the response frame, a trigger frame over the wireless medium from the AP, the trigger frame allocating a portion of the contention-based TXOP to the wireless communication device for the P2P communications; and transmit or receive P2P data to or from the client device over the wireless medium during the allocated portion of the contention-based TXOP.

23. The wireless communication device of claim 22, wherein the request indicates one or more of a duration of the requested part of the TXOP, a requested bandwidth for the P2P communications, a traffic identifier (TID) of the P2P communications, a Stream Classification Service (SC S) identifier (SCSID) of the P2P communications, a requested start time of a service period associated with the P2P communications, a requested service interval for the P2P communications, a delay bound for the service period associated with the P2P communications, or a requested type of trigger frame.

24. The wireless communication device of claim 22, wherein the MAC header of the frame includes a Quality-of-Service (QoS) control field carrying the request.

25. The wireless communication device of claim 24, wherein the QoS control field includes an End Of Service Period (EOSP) subfield, an Acknowledgement (ACK) Policy Indicator subfield following the EOSP subfield, a reserved bit following the ACK Policy Indicator subfield, and an octet following the reserved bit, wherein the octet indicates one or more of a duration of the requested part of the TXOP, a queue size of the wireless communication device, or a TXOP sharing mode bandwidth based on values carried in the EOSP subfield and the reserved bit.

26. The wireless communication device of claim 22, wherein the MAC header of the frame includes an Aggregated-Control (A-Control) subfield carrying the request.

27. The wireless communication device of claim 26, wherein the A-Control subfield includes:

a Control Identification (ID) subfield carrying a reserved value indicating that the frame is a P2P request frame; and a Control Information subfield carrying one or more parameters for the P2P communications associated with the request for the allocated portion of the TXOP.

28. The wireless communication device of claim 22, wherein the MAC header of the response frame includes a QoS control field or an Aggregated-Control (A-Control) subfield indicating one or more of a duration of the requested part of the TXOP, a bandwidth to be allocated for the P2P communications, a traffic identifier (TID) of the P2P communications, a Stream Classification Service (SCS) identifier (SCSID) of the P2P communications, a start time for a service period associated with the P2P communications, a service interval associated with the P2P communications, a delay bound for the service period associated with the P2P communications, or a requested type of trigger frame.

* * * * *